(12) United States Patent
Hu

(10) Patent No.: US 11,237,704 B2
(45) Date of Patent: Feb. 1, 2022

(54) PROCESSING METHOD, APPARATUS, AND CLIENT TERMINAL FOR DISPLAYING USER SPECIFIED INFORMATION OF DATA ITEM

(71) Applicant: Alibaba Group Holding Limited, Grand Cayman (KY)

(72) Inventor: Xiaoyan Hu, Hangzhou (CN)

(73) Assignee: Alibaba Group Holding Limited

( * ) Notice: Subject to any disclaimer, the term of this patent is extended or adjusted under 35 U.S.C. 154(b) by 108 days.

(21) Appl. No.: 15/728,207

(22) Filed: Oct. 9, 2017

(65) Prior Publication Data
US 2018/0101286 A1 Apr. 12, 2018

(30) Foreign Application Priority Data

Oct. 10, 2016 (CN) .......................... 201610884111.2

(51) Int. Cl.
| | |
|---|---|
| *G06F 3/0483* | (2013.01) |
| *G06F 3/0484* | (2013.01) |
| *G06Q 30/06* | (2012.01) |
| *G06F 3/0482* | (2013.01) |
| *G06F 3/0488* | (2013.01) |

(52) U.S. Cl.
CPC .......... *G06F 3/0483* (2013.01); *G06F 3/0482* (2013.01); *G06F 3/04847* (2013.01); *G06F 3/04883* (2013.01); *G06Q 30/0643* (2013.01)

(58) Field of Classification Search
CPC ........ G06F 16/986; G06F 3/048; G06Q 30/06
See application file for complete search history.

(56) References Cited

U.S. PATENT DOCUMENTS

| | | | | |
|---|---|---|---|---|
| 8,850,362 B1* | 9/2014 | Khoshnevisan | ...... | G06F 16/951 715/853 |
| 2002/0002408 A1* | 1/2002 | Kobayashi | ............ | G06Q 10/00 700/29 |
| 2002/0171691 A1* | 11/2002 | Currans | ................ | G06F 1/1626 715/864 |
| 2005/0164789 A1* | 7/2005 | Nakamura | .............. | A63F 13/12 463/36 |

(Continued)

OTHER PUBLICATIONS

PCT Search Report and Written Opinion dated Dec. 15, 2017 for PCT Application No. PCT/US17/55783, 8 pages.

*Primary Examiner* — Jennifer N Welch
*Assistant Examiner* — Qi Wan
(74) *Attorney, Agent, or Firm* — Lee & Hayes, P.C.

(57) ABSTRACT

Methods, apparatuses, and client terminals for displaying user specified information of a data item. The method includes determining a user operation associated with a target data item on a data item display page; obtaining item information of the target data item from at least one data source when an instruction satisfying a preset trigger condition; determining user specified information of the target data item based on the item information; generating an information interface based on the user specified information; and displaying the information interface on the data item display page. The methods, apparatus, and client terminals, provided in example embodiments of the present application can lower the cost of decision making based on information noise reduction, optimize user data item information interactive experience, and improve user data item purchasing experience.

19 Claims, 21 Drawing Sheets

(56) References Cited

U.S. PATENT DOCUMENTS

| | | |
|---|---|---|
| 2005/0187967 A1 | 8/2005 | Couch et al. |
| 2005/0251760 A1* | 11/2005 | Sato ................ G06F 3/023 715/856 |
| 2006/0010396 A1* | 1/2006 | Beezer ............. G06F 17/241 715/802 |
| 2010/0011315 A1* | 1/2010 | Araki .............. G06F 3/0482 715/783 |
| 2011/0099044 A1 | 4/2011 | Mediano |
| 2013/0204748 A1* | 8/2013 | Sugiura ........... G06Q 30/0601 705/26.63 |
| 2013/0298208 A1 | 11/2013 | Ayed |
| 2014/0075390 A1 | 3/2014 | Gauthier et al. |
| 2014/0078082 A1* | 3/2014 | Wu ................. G06F 3/0484 345/173 |
| 2014/0129932 A1* | 5/2014 | Ali ................. G06Q 30/0643 715/702 |
| 2014/0358727 A1 | 12/2014 | Shannon et al. |
| 2014/0372943 A1* | 12/2014 | Kroupa ............ G06F 3/0482 715/808 |
| 2015/0006313 A1* | 1/2015 | Beaver ............. G06F 16/986 705/26.5 |
| 2015/0186985 A1* | 7/2015 | Alcott ............. G06Q 30/0643 705/7.29 |
| 2015/0309705 A1 | 10/2015 | Keeler et al. |
| 2015/0371321 A1 | 12/2015 | Chapuis et al. |
| 2016/0162149 A1* | 6/2016 | Lee ................. G06F 1/1694 715/835 |
| 2016/0283998 A1* | 9/2016 | Pathak ............. G06Q 30/0627 |
| 2016/0321728 A1* | 11/2016 | Kawai .............. G06Q 30/0603 |
| 2018/0075110 A1* | 3/2018 | Cho ................. G06F 16/287 |

\* cited by examiner

PROCESSING METHOD, APPARATUS, AND CLIENT TERMINAL FOR DISPLAYING USER SPECIFIED INFORMATION OF DATA ITEM

CROSS REFERENCE TO RELATED PATENT APPLICATIONS

This application claims priority to Chinese Patent Application No. 201610884111.2, filed on Oct. 10, 2016, entitled "Processing method, system, and client terminal for displaying user specified information of data item," which is hereby incorporated by reference in its entirety.

TECHNICAL FIELD

The present application relates to the field of interactive data processing technologies, and in particular, to methods, apparatuses, and client terminals for displaying user specified information of a data item.

BACKGROUND

With continuous development of computer technologies and network communication technologies, portable terminals devices, such as cellular phones and tablets, are becoming more and more popular. Users may meet various life and work needs through applications of client terminals. For example, users can shop data products online through cellular phones.

Currently, users usually need to obtain products' information when shopping for products, in order to decide whether they need to purchase the products. For example, a web page may display multiple products information through selecting product category or searching for a specific product. Users may select a specific product to obtain more detail information of the product. However, users can only navigate the web pages back and forth based on the web page design. Such as, on a search result page, users can only click on a product picture or select a link to enter a detailed description page. If users do not get the information they need, they have to navigate back to the search result page to check other products on the search result page. The manner of navigating back and forth to acquire products' information increases the workload of data processing on the client terminal (information buffering, rending web page, etc.). It also increases users' waiting time. Furthermore, the product detail page usually contains multiple dimensions display of the product, and more complex information. For example, some users may not need these information, such as instruction menu, function descriptions, warranty, etc. The complex information on a product detail page may increase users' browsing time, and may further confuse users. Users may omit some information, and even miss important information. It increases users' cost to acquire useful information and affects user experience.

Currently, one way to acquire product information is to get a screen shot of the product detail information page, and display the screen shot as a thumbnail to the users. However, the information displayed to the users is usually only part of the screen shot, which includes the product photo and the title of the page. The screen shot includes the fixed information while rending the product detail page, which may still include unnecessary product information, or cannot cover the information which is required for users to make a purchase decision. The information displayed on the thumbnail is still not designed based on users' requirements for making purchase decision. Additionally, the way to display a thumbnail of product detail page merely displays mirror image of the product detail page, it does not provide any interaction with users which results in poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present application.

The present application provides methods, apparatus, and client terminals for displaying user specified information of data item, which can lower the cost of decision making based on information noise reduction, optimize user data item information interactive experience, and improve user data item purchase experience. To achieve the above objective, one aspect of the present application provides a processing method, apparatus, and client terminal for displaying user specified information of data item:

determining a user operation associated with a target data item on a data item display page;

obtaining item information of the target data item from at least one data source when an instruction satisfying a preset trigger condition;

determining user specified information of the target data item based on the item information;

generating an information interface based on the user specified information; and displaying the information interface on the data item display page.

To achieve the above objective, another aspect of the present application provides a processing method for displaying user specified information of data item, the method includes:

Monitoring operations on a data item display page, obtaining corresponding instructions, associating the instructions with a target data item;

When the instructions satisfying a preset trigger condition, displaying at least one category of information guidance options of the target data item on the data item display page, the information guidance options are generated according to the user specified information of the target data item based on item information of the target data item, wherein the item information is obtained from the target data item from at least one data source, and also according to the category of the user specified information;

When the information guidance option is triggered, navigating to the corresponding information display page.

To achieve the above objective, another aspect of the present application provides a processing apparatus for displaying user specified information of data item, the apparatus includes:

an operation monitoring unit configured determine a user operation associated with a target data item on a data item display page;

a data acquiring unit configured to obtain item information of the target data item from at least one data source when an instruction satisfies a preset trigger condition;

an information constructing unit configured to determine user specified information of the target data item based on the item information;

an interface generating unit configured to generate an information interface based on the user specified information; and a displaying unit configured to display the information interface on the data item display page To achieve the above objective, another aspect of the present application provides a processing apparatus for displaying user specified information of data item, the apparatus includes:

An operation monitoring unit configured to monitor operations on a data item display page, and obtain corresponding instructions, associating the instructions with the target data item;

A first processing unit configured to, when the instructions satisfying a preset trigger condition, display at least one category of information guidance options of the target data items on the data item display page, the information guidance options are generated according to the user specified information of target data items based on item information of the target data items, wherein the item information is obtained from the target data items from at least one data source, and also according to the category of the user specified information;

A second processing unit configured to, when the information guidance options are triggered, navigate to the corresponding information display page.

The present application provides a client terminal, the client terminal includes:

a display unit configured to display a data item display page;

a sensor unit configured to obtain operations on the data item display page;

a processing unit, coupled to the display unit and the sensor unit, configured to:

determine a user operation associated with a target data item on the data item display page, obtain item information of the target data item from at least one data source when an instruction satisfying a preset trigger condition, determine user specified information of the target data item based on the item information, and generate an information interface based on the user specified information; and the display unit further configured to display the information interface on the data item display page The present application further provides a client terminal, the client terminal includes:

A display unit configured to display a data item display page;

A sensor unit configured to obtain operations on the data item display page;

A processor, coupled to the display unit and the sensor unit, configured to determine instructions corresponding to the operations, the instructions are associated with target data items, when the control instructions satisfying a preset trigger condition, display at least one category of information guidance options of the target data items on the data item display page, the information guidance options are generated according to user specified information of target data items based on item information of the target data items, wherein the item information is obtained from the target data items from at least one data source, and also according to the category of the user specified information; and The display unit further configured to, when the information guidance options are triggered, navigate to the corresponding information display page.

The present application provides methods, apparatus, and client terminals for displaying user specified information of data item. Users may use simple operations, such as long press or click, to pop up an information interface over a data item display page. The information interface could be generated based on the user specified information of target data items. The present application provides flexible, effective user specified information to users directly. With the information interface, obtained after information noise reduction, users do not need to navigate the detailed product page to browse complicated information. Therefore, the present application provides a pop up information interface with user specified information of the data items, over the data item display page. It enables users to obtain user specified information fast and directly. It lowers the cost of decision making based on information noise reduction, optimizes user data item information interactive experience, and improves user data item purchasing experience.

Specific example embodiments of the present application are disclosed in detail with reference to the subsequent descriptions and accompanying drawings, and manners with which the principle of the present application can be employed are specified. It should be understood that the scope of the example embodiments of the present application is not limited thereto. The example embodiments of the present application include numerous variations, modifications and equivalences within the spirit and the scope of terms of the appended claims.

A feature described and/or shown for an example embodiment may be used in one or more other example embodiments in an identical or similar manner, be combined with a feature in another example embodiment, or replace a feature in another example embodiment.

It should be emphasized that, the term "include/comprise" refers to existence of a feature, assembly, step, or component when used in this text, but does not exclude existence or addition of one or more other features, assemblies, steps, or components.

BRIEF DESCRIPTION OF THE DRAWINGS

Accompanying drawings provide further understanding on the example embodiments of the present application, and constitute a part of the specification. The accompanying drawings exemplify the example embodiments of the present application, and illustrate the principle of the present application together with text descriptions. Apparently, the accompanying drawings described below are merely some example embodiments of the present application, and other accompanying drawings can further be obtained according to these accompanying drawings by those of ordinary skill in the art without creative labor. In the accompanying drawings.

DETAILED DESCRIPTION

For those skilled in the art to better understand the technical solutions in the present application, the technical solutions in the example embodiments of the present application are further described in detail below through the accompanying drawings. Apparently, the described example embodiments are merely some example embodiments of the present application and do not constitute limitation to the present application. Any other embodiments based on the example embodiment of the present application, derived by those of ordinary skill in the art, without any creative efforts, shall all fall within the protection scope of the present application.

Figure 1:
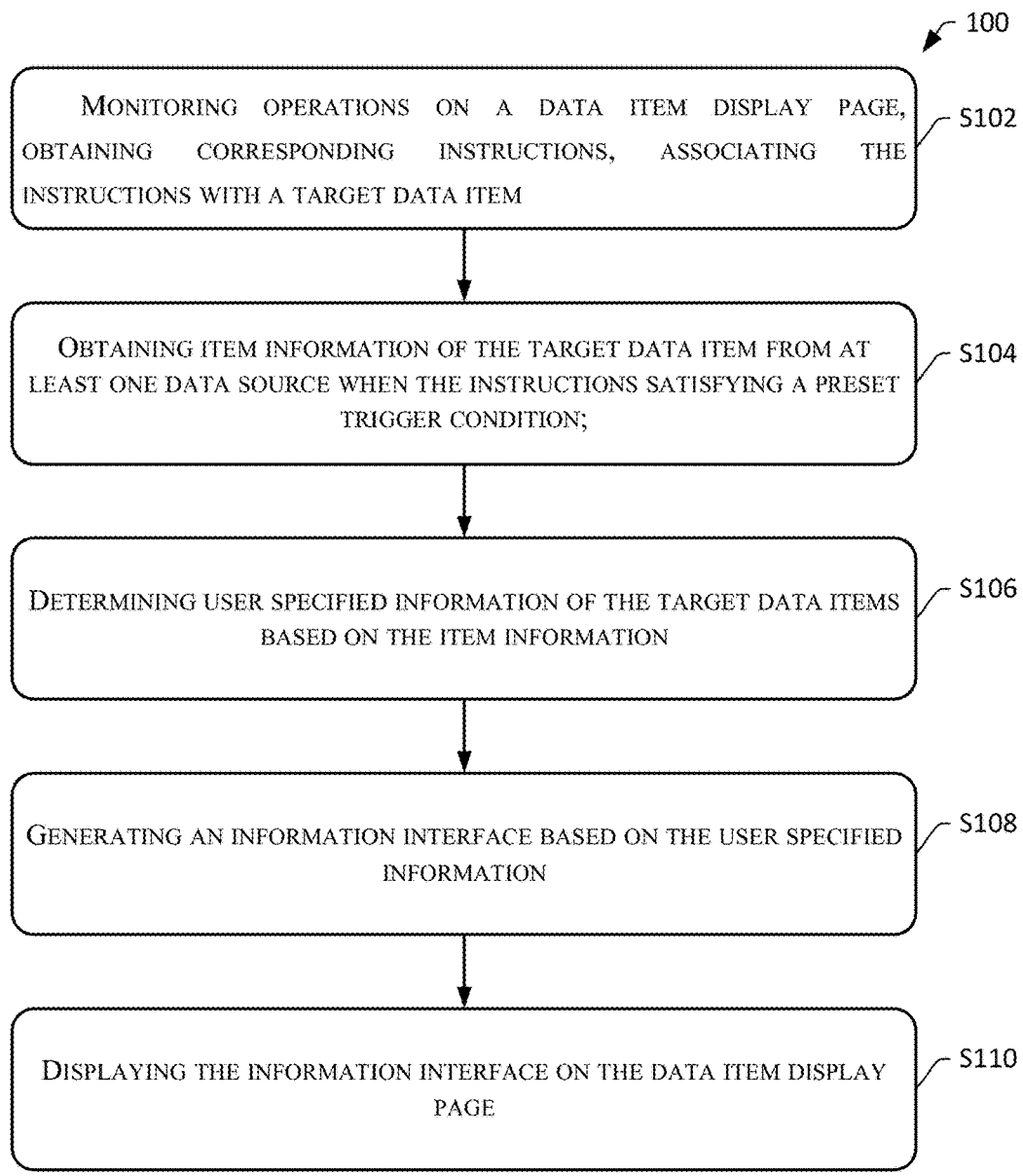
FIG. 1 is a flowchart of a method for presenting user specified information of a data item according to an example embodiment of the present application.

Referring to FIG. 1, a processing method for displaying user specified information of data item 100 according to an example embodiment of the present application may include:

Step S102: Monitoring operations on a data item display page, obtaining corresponding instructions, associating the instructions with target data items.

Figure 2:
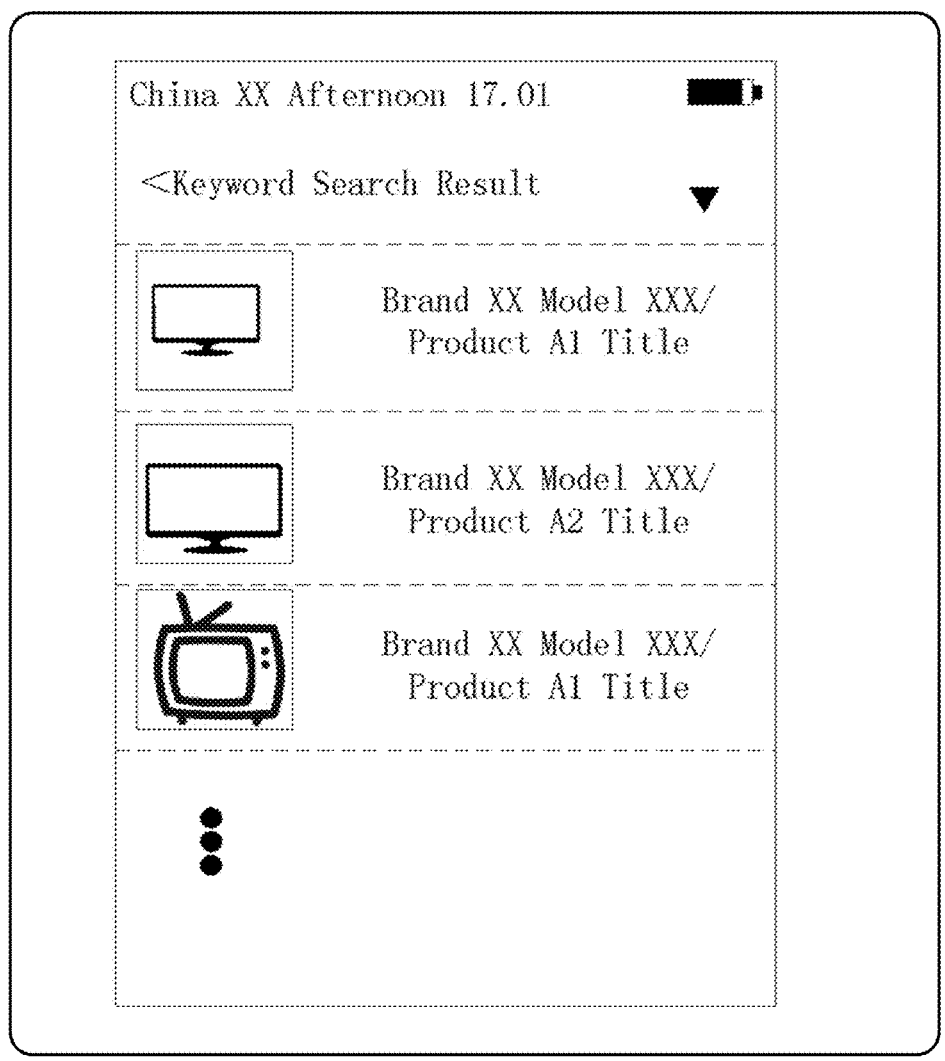
FIG. 2 is a schematic diagram of a data item display page based on search results according to an example embodiment of the present application.

The data item is corresponding to different target objects in different application scenarios. For example, in online shopping scenario, the data item could be a product. While in other scenarios, the data item could be a service. The data item display page can have different formats or structures based on different data item display scenarios. Such as, it could be one format for recommended data items display. And it could be a different format for data items based on keyword search results. FIG. 2 is a schematic diagram of a data item display page based on search results according to an example embodiment of the present application. Referring to FIG. 2, generally, a data item display page may include one or more display windows of data item information. The data item information in each display window may be set to correspond to the data item's photo and related text introduction. In this example embodiment, the data item display page may be based on user data item keyword search results. However, those of ordinary skill in the art should be able to apply the idea of this example embodiment to other different scenarios where the data item display page displays data item user specified information.

When users search data item keywords, a client terminal application displays search results of the data items on the data item display page. Users can navigate and browse the search result page which may contain multiple data items. Each display window on the search result page may be set to display corresponding data item's thumbnail and data item's title. The data item thumbnail and the data item's title can link to data item detail page. Generally, when users click on the thumbnail or the title, it navigates to the data item detail page to display the detail information of the data item. Users may have other operations on the display page, such as slide, long press, click, etc. The operations can be transformed to corresponding control instruction on the client terminal. The client terminal may obtain the control instructions.

It should be noted that the operations may include touch, such as slide, long press operations by user's finger touching a screen at the client terminal. The operations may also include operations by mouse, or any stylus. And the operations may also be body gestures, such as hand gestures, eye movements, or blowing air, etc. The target data items can be determined by the operations to the data items, such as user double click on the data item or long press for more than 1.5 seconds on the data item, etc.

In this example embodiment, the client terminal may monitor user's operations on the data item display page, transfer them to the corresponding control instructions.

Step S104: Obtaining item information of the target data items from at least one data source when the instructions satisfying a preset trigger condition;

In this example embodiment, there is an interactive triggering mechanism for displaying data items user specified information. Specifically, there is a preset trigger condition.

After obtaining the instructions, the method may compare the instructions with the preset trigger condition. If the instructions satisfy the preset trigger condition, the method then obtain item information of the target data items from at least one data source. The preset trigger condition may be preset as users operations. For example, it could be clicking on a display window three times within one second, tracing a circle around the display window, or long pressing a product photo or title for more than 1.5 seconds. Designers can preset the trigger condition for displaying information interface on the data item display page.

In this example embodiment, the item information is selected from different data information of a data item which the data information affects users' selection of the data item or users' focus on the data information specifically. Those of ordinary skill in the art should understand that each data item has multiple data information, such as data item generated time, attributes, categories, metadata, last modified, etc. However, users may not focus on all data information of the data item. Therefore, the example embodiment would select item information which are focused by users.

Generally, the item information may be determined by the categories of the data item. Categories of the data item represent the category information of the data item. Each data item may have one or more categories, such as data item's identifier, attribute field, etc. Those of ordinary skill in the art should understand that, based on these categories, the data item can be categorized into different categories. The categorization enables administration and analyzation of large amount of data items easily. For examples, when the data item is a product, the category of the data item could be the category of the product, such as virtual product, clothes, accessories, beauty, digital, home, electronics, mothers and babies, foods, entertainments and sports, services, etc.

In this example embodiment, research shows that users may focus on different data information based on different categories. Therefore, categories can be associated with item information. For example, if the category is clothes, users focus more on display of the item. Therefore, the photo of the item can be set as the item information. If the category is electronics, users may focus more on functions. Then the specification may be set as the item information.

The association of categories and the item information can be preset or can be modified during the process. There is no limitation in this example embodiment.

In this example embodiment, based on the categories, the item information can be obtained real time from at least one data source, such as user attribute database, user behavior database, data item category database, data item associated database, etc. In the next embodiment, we will provide more detail steps on obtaining the item information.

Step S106: determining user specified information of the target data items based on the item information;

The item information obtained in step S104 can be combined to construct the user specified information.

The user specified information is the combination of item information. It is used to display one or more item information to users. Thus, it makes it easier for users to make decisions.

In this example embodiment, after obtaining the item information of a data item, there are multiple methods to construct the user specified information. Specifically, a constructing method includes:

Setting each individual item information as user specified information. Such as, for a data item of a refrigerator, the decision making information is "frost-free", or "air-cooled"; for a data item of a shirt, the decision making information is "slim fit"; for a data item of baby formula, the decision making information is "Imported from Australia;"

Combining one or more item information with preset order to generate the user specified information. For example, for a data item of a refrigerator, the decision making information can be constructed with the following six item information, such as "no frost", "air-cooled", "energy saver", "modern style", "mini", "light weight." For a data item of a wind breaker, the user specified information can be constructed with the following item information, such as wind breaker's four-sided view image, materials, and video.

In other embodiments, the user specified information can be determined by different item information. Specifically, the user specified information can be constructed based on application scenarios or customized user specified information. In this example embodiment, the item information of the data item may include, but is not limited to, one or more information descriptions of pictures, text, video, audio. The user specified information can be a set of information that contains multiple parameters, or a set of pictures, or multiple types of information that contain multi-media information such as voice, video, and so on.

Step S108: generating an information interface based on the user specified information.

Based on the user specified information in Step S106, the user specified information can be combined to generate information interface. In the present embodiment, the information interface is an interface layout presented to the user, and the combination of the obtained user specified information can be made according to preset method.

In one example embodiment, those skilled in the art may include three main pictures of a rice cooker product in the information interface. The three main pictures can be displayed simultaneously in the information interface. In another example embodiment, the information interface may include five model pictures of a garment product. Only one of the five pictures may be displayed in real time in the information interface, and the user can slide left or right or click on left or right arrow to see other pictures. Alternatively, in another example embodiment, the information interface may also display six key parameters of the refrigerator in a three-row by two-column layout.

Step S110: displaying the information interface on the data item display page.

The information interface is displayed on the data item display page, so that the user can quickly make the purchase decision of the data item based on the user specified information displayed in the information interface. It reduces the decision making cost of the data item and improves the user data item shopping experience.

Those skilled in the art should understand that this display may be accomplished in a number of ways. For example, the information interface is suspended as a floating layer (transparent, translucent, or opaque), the information interface is displayed as a banner around the data item, and so on. The present application has no limit here.

Figure 3:
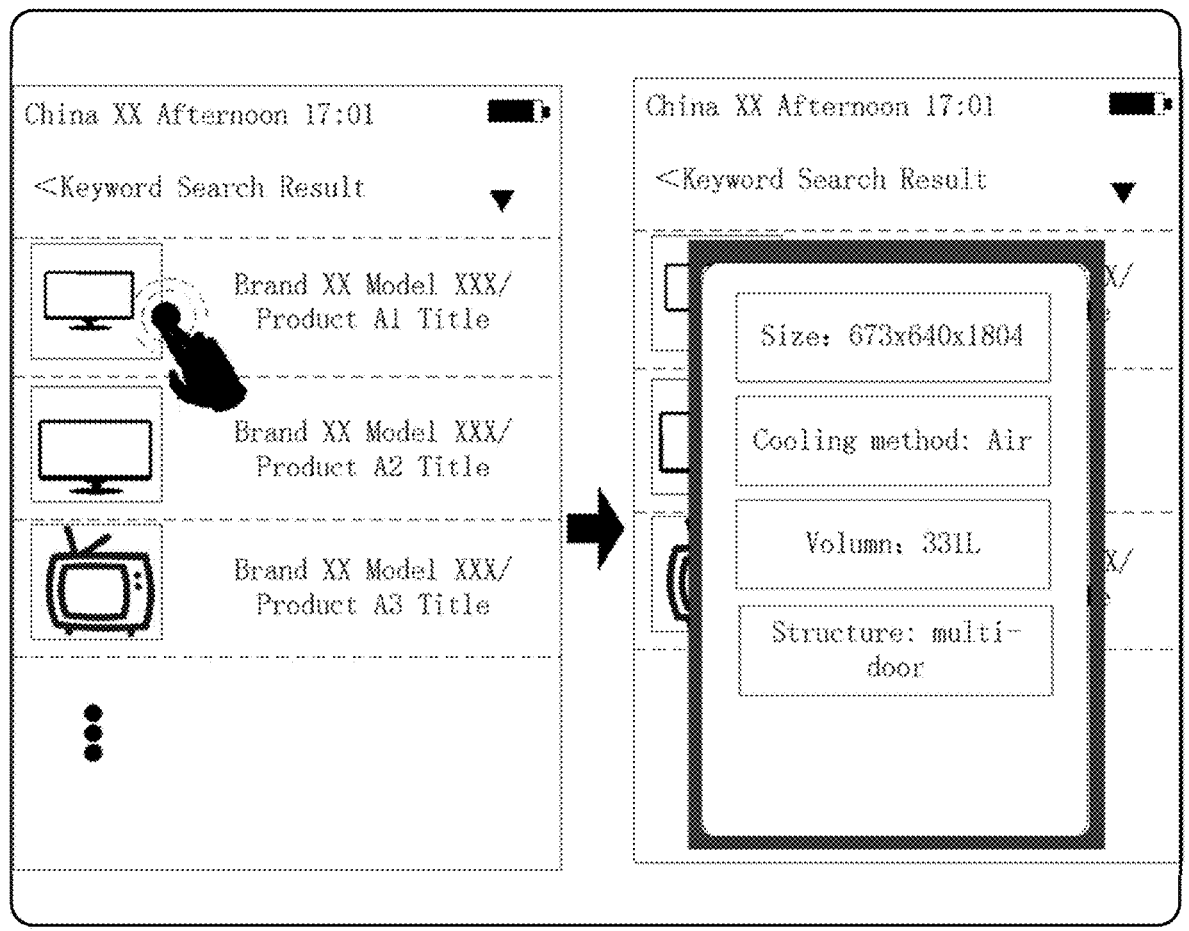
FIG. 3 is an example schematic diagram of an information interface that includes user specified information on a data item display page.

FIG. 3 is an example schematic diagram of an information interface 300 that includes a user specified information on a data item display page. As shown in FIG. 3, if a user only considers frost-free refrigerator, the user searches keyword "refrigerator" and then the display page will show multi-brand multi-model refrigerators. The display pages with several refrigerators may not contain the refrigerator cooling method information. With the implementation of the present application, the user can perform a specified operation on the display window of the refrigerator A1, such as long press.

When the client terminal recognizes that the user presses for more than 1.5 seconds, an information interface can be displayed on the data item display page. The information interface may include the length and height of the refrigerator A1, the cooling mode, the capacity, the door structure, four user specified information. When the user browsed the user specified information of the refrigerator A1, and found that the refrigerator cooling method is "straight cold" (non-air-cooled frost-free), the user no longer need to click into the data item detail page to view data item detail information, the data item can be excluded directly, thus saving user data item decision making time, and improving user decision making efficiency.

Generally, besides the user specified information of a target data item, the information interface may also include other auxiliary information of the data item, such as, place of origin, date on the market, and so on. In one embodiment of the present application, the information interface may include only the user specified information set in advance in the target data items, such as the main image, the key parameters, the main focus information. This method to determine the user specified information removes most of the auxiliary information. This method removes less impact information by focusing on the user specified information for the target data item. Only user specified information of data items is displayed to the user. It enables users to quickly locate user specified information of interest data items, reduces the user data item purchase decision making costs, optimizes the user data item information interactive experience, and improves the user data item purchase experience.

In one embodiment, the information interface may be provided over the data page display item as a floating layer. The information interface can be set to appear on the data item display page. It can also be designed to be float on top of the data item display page. It can be set with different degrees of transparency. It enhances the user data item information interactive experience, and improves the user data item purchase experience.

The present application provides methods, apparatus, and client terminals for displaying user specified information of data item. Users may use simple operations, such as long press or click, to pop up an information interface over a data item display page. The information interface could be generated based on the user specified information of target data items. The present application provides flexible, effective user specified information to users directly. With the information interface, obtained after information noise reduction, users do not need to navigate the detailed product page to browse complicated information. Therefore, the present application provides a pop up information interface with user specified information of the data items, over the data item display page. It enables users to obtain user specified information fast and directly. It lowers the cost of decision making based on information noise reduction, optimizes user data item information interactive experience, and improves user data item purchasing experience.

In one embodiment of present application, an information interface is a user interactive interface generated according to the obtained user specified information of target data items. When the user clicks or slides on the information interface, it can trigger the appropriate behavior of the corresponding interaction. Accordingly, another embodiment of the present application provides a processing method for displaying user specified information of data item, the method includes: executing a corresponding operation in response to an instruction generated based on the interaction with the information interface.

Figure 4:
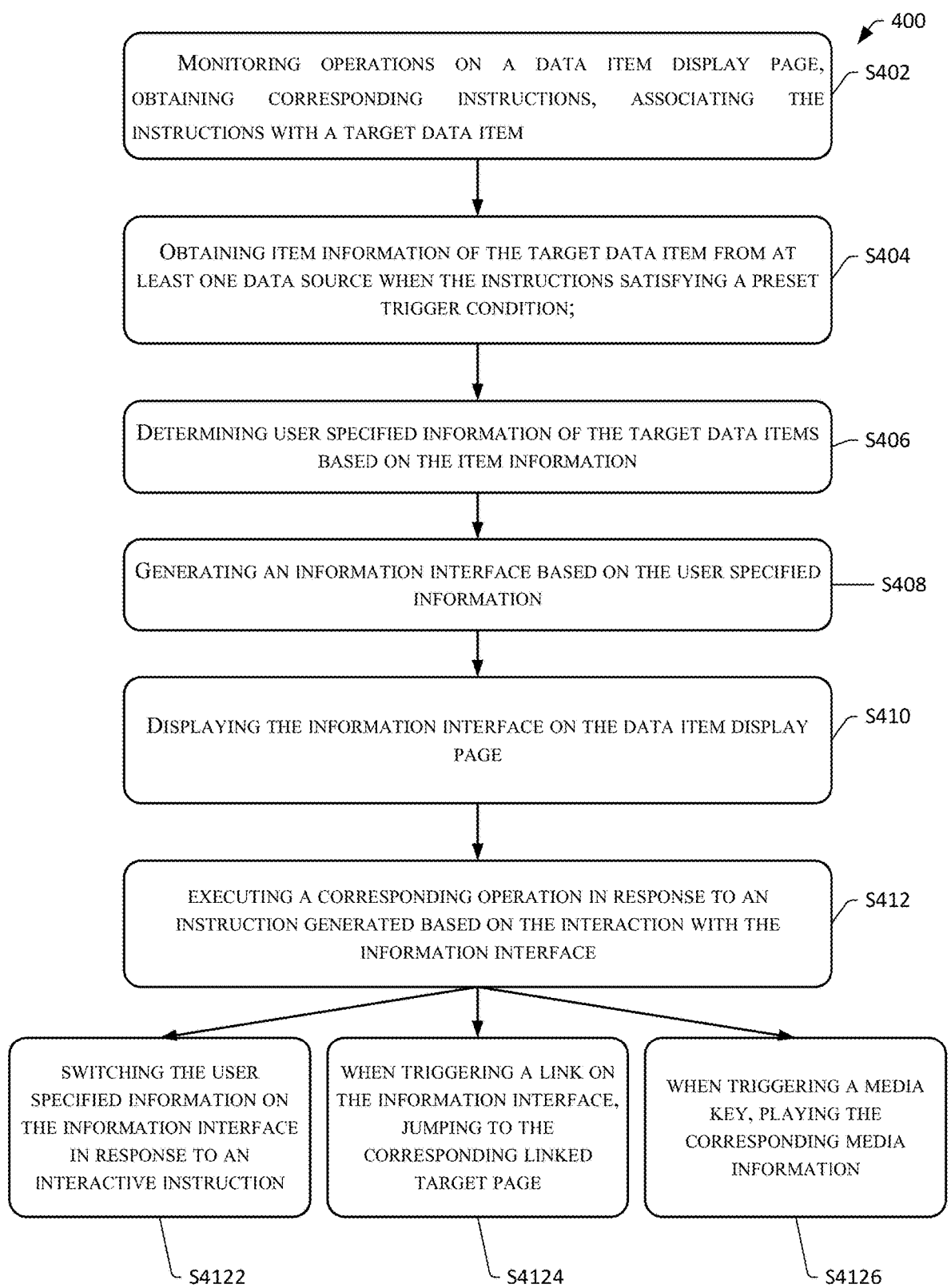
FIG. 4 is a flowchart of a method for presenting user specified information of data item according to another example embodiment of the present application.

FIG. 4 is a flowchart of a method 400 for presenting user specified information of data item according to another example embodiment of the present application. In FIG. 4, S402-S412 individually correspond to S102-S112. Details of S402-S412 can be referenced to corresponding descriptions of S102-S112, and are not repeatedly herein. The method 400 further includes executing a corresponding operation in response to an instruction generated based on the interaction with the information interface at S412. In implementations, specific interactive operation instruction and the corresponding response can be customized according to different application scenarios, such as enlarging image, flipping through multiple photos on the user specified information page, and so on. In another embodiment of the present application, performing a corresponding operation in response to an instruction generated based on the interaction with the information interface comprises at least one of the following:

Step 4122: switching the user specified information on the information interface in response to an interactive instruction;

Step 4124: when triggering a link on the information interface, jumping to the corresponding linked target page;

Step 4126: when triggering a media key, playing the corresponding media information.

This example embodiment can provide, but is not limited, a rich interactive interface. It provides the user an interactive way to browse data item information more comprehensively, conveniently, and efficiently. It meets the needs of the user, and improves user experience.

Figure 5:
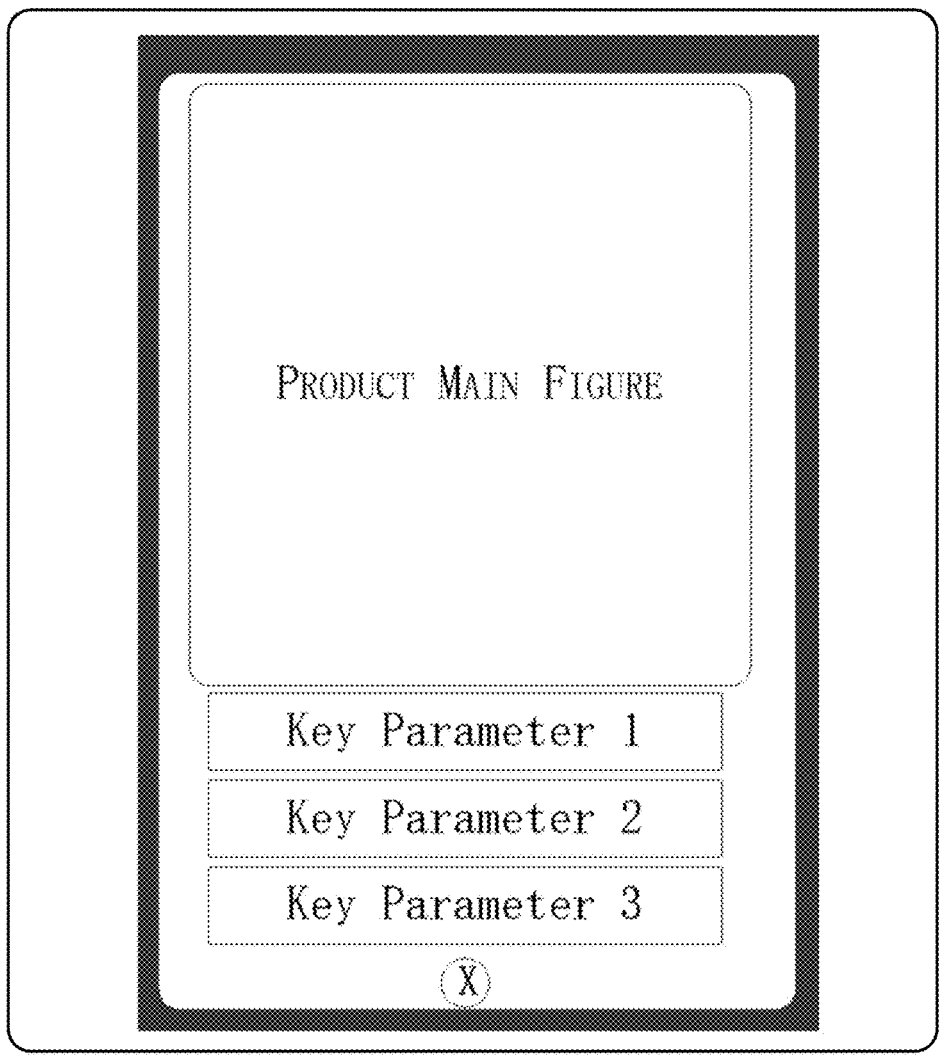
FIG. 5 is a template of an information interface according to an example embodiment of the present application.

In an embodiment of the present application, all of the information interface may adapt a unified template or style. A template in the example embodiment is shown in FIG. 5. The template may comprise at least one main photo of the product and at least three key parameters. Another embodiment of the present application, different templates may be used to accommodate different types of data items, therefore, further optimize the user interface. In another example embodiment of the present application, different categories of user specified information can be displayed on an information interface according to categories of data items, therefore, display the user specified information on the information interface with different style. Specifically, in this embodiment, obtaining user specified information of target data items from at least one data source may include:

determining the category of the user specified information to be displayed according to the category of the target data item;

obtaining item information of the category of the user specified information from at least one corresponding data source based on the category of the user specified information.

As described above, large amount of information is stored with data items. Based on the attribute category of a data item, the item information associated with the attribute category of the item information can be determined. Specifically, according to attributes category, item information can be determined based on the categories of data items. Thus, for a user selected target data item, determining the corresponding attribute category of the target data item, determining the category of the user specified information under the attribute category, selecting corresponding item information under the category of the user specified information from the data information of the target data items for further processing. Various data information of target data items may be obtained from one or more data sources, such as, product database of data items, third-party website data, and so on.

For example, categories of user specified information can be divided into parameters, material, pictures, videos, user assessment, recommendations, and other types. Those skilled in the art understand that there are more types, not limited to the types presented here.

In an example embodiment, for the clothing, hats, shoes, pants, bags and other types of products, the category of the user specified information can be set as a picture, material;

In another example embodiment, for digital and home appliances two categories of product, the category of the user specified information can be set as descriptions, pictures;

In yet another example embodiment, for beauty products, the category of the user specified information can be set as evaluation, recommendations.

Thus, when processing a data item of sweater, the category of the user specified information can be set as "picture" and "material" based on the product attribute category of sweater is "clothing". Then, the method retrieves the item information under categories of "picture" and "material" of the sweater product from the product database. Specifically, categories of user specified information based on category attribute of data item can be constructed based on application scenarios or customized design.

In another example embodiment, the construction of user specified information of the target data item based on the item information includes:

combining the item information based on the corresponding categories of user specified information; generating the user specified information of the target data item;

After obtaining the item information of the data item, generating the user specified information of the target data item according to the item information. Specifically, the construction of the user specified information can be determined according to the actual application scenario of the user specified information of the data item or customized user specified information, such as in the above scenario where the data item is a garment product, if seven pictures are selected as item information, these seven pictures may be used to generate a user specified information which includes the seven pictures.

Those skilled in the art may understand that the combination process is not limited to: splicing, adding, accumulation, and so on.

In another embodiment of the method, generating an information interface based on the user specified information may comprise:

placing the user specified information to corresponding display window of the information interface template, generating information interface.

In an example embodiment, as described above, the data item is a clothes product in the application scenario. When the user specified information is determined, the user specified information is placed to corresponding display window of the information interface template. For example, the seven pictures user specified information will be loaded in the main picture display window in the information interface template or the attribute category user specified information can be display right below the main display area, where the user specified information comprises six key parameters, such as clothing materials, style, origin, neckline design, and so on.

Figure 6:
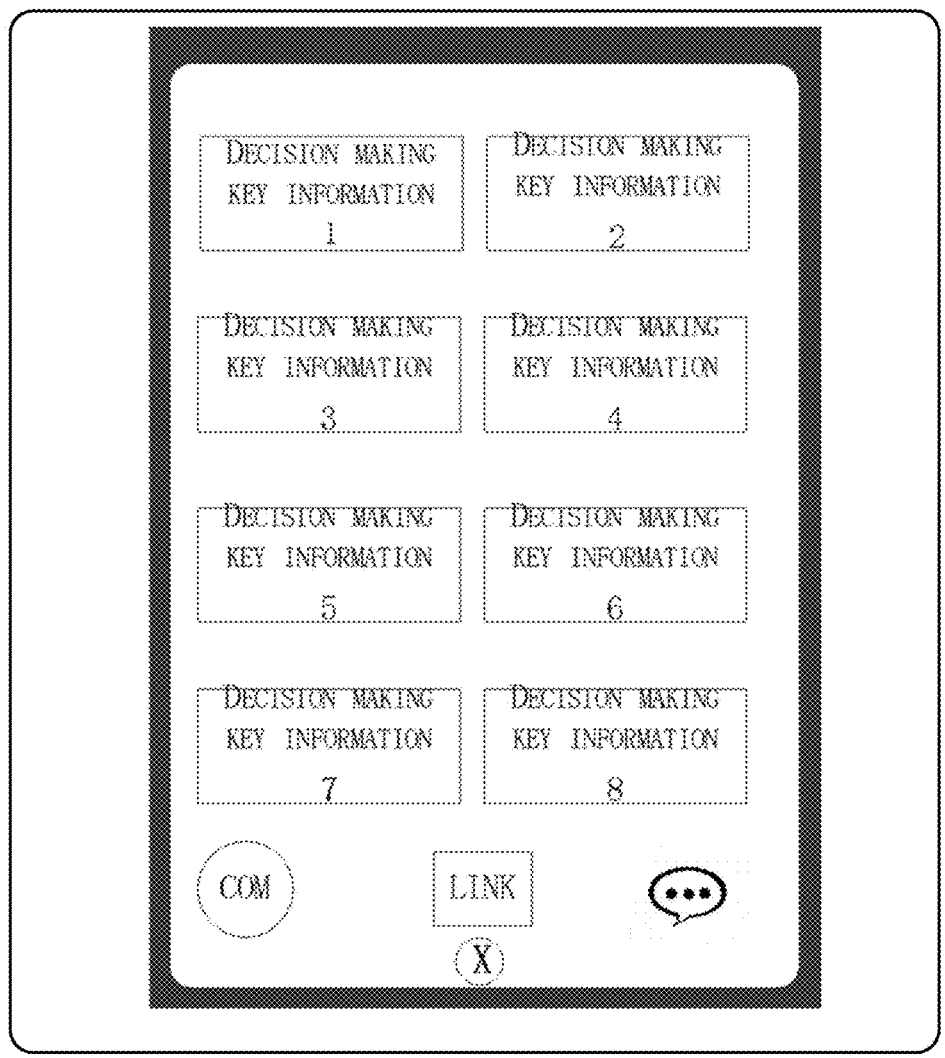
FIG. 6 is an example schematic diagram of an information interface for user specified information display for standard products.
Figure 7:
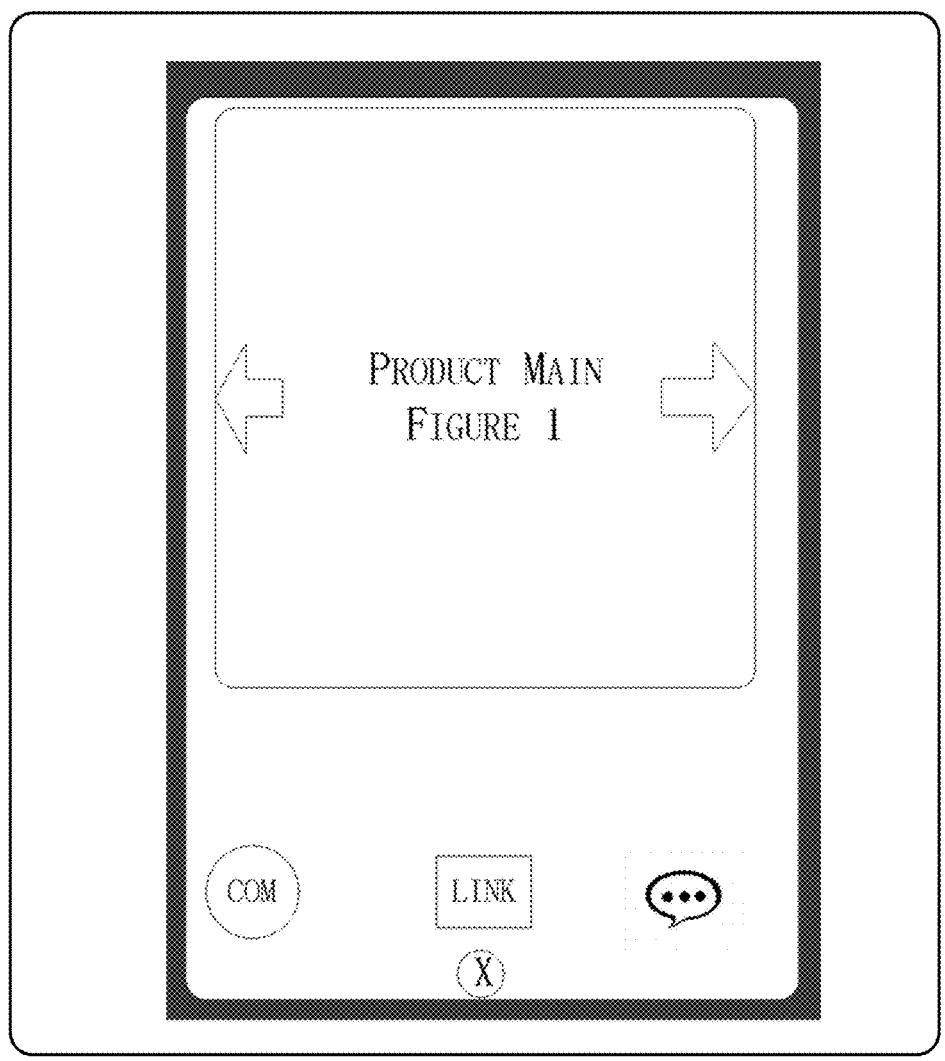
FIG. 7 is an example schematic diagram of an information interface for user specified information display for non-standard products.

This embodiment can be implemented to reduce information noise in accordance with different attribute information of different categories and display different user specified information. For example, in an example embodiment, for non-standard products, users pay more attention to the product image information, such as shoes, bags, coats, and seller shows, or product's video information. For standard products, users may be more concerned about the parameters of products, such as laptops, cell phones models, memory size, storage space, and so on. Therefore, in the present example embodiments, products can be categorized into standard and non-standard products. For standard products, the category of user specified information on the information interface is product parameter, such as basic parameters or user selected parameters of interest. For non-standard products, the category of user specified information on the information interface is product image. FIG. 6 and FIG. 7, respectively, are example schematic diagrams of a information interface for user specified information display for standard and non-standard products. Users can browse different product images through left and right arrows in FIG. 7. Of course, the user specified information displayed on the information interface can be categorized differently. With the present embodiment scheme, the information interface can display different user specified information to users for decision making. For example, FIG. 6 shows user specified information 1, user specified information 2, etc., to the users for decision making. It may further optimize user interactive interface, and improve the user experience.

Figure 8:
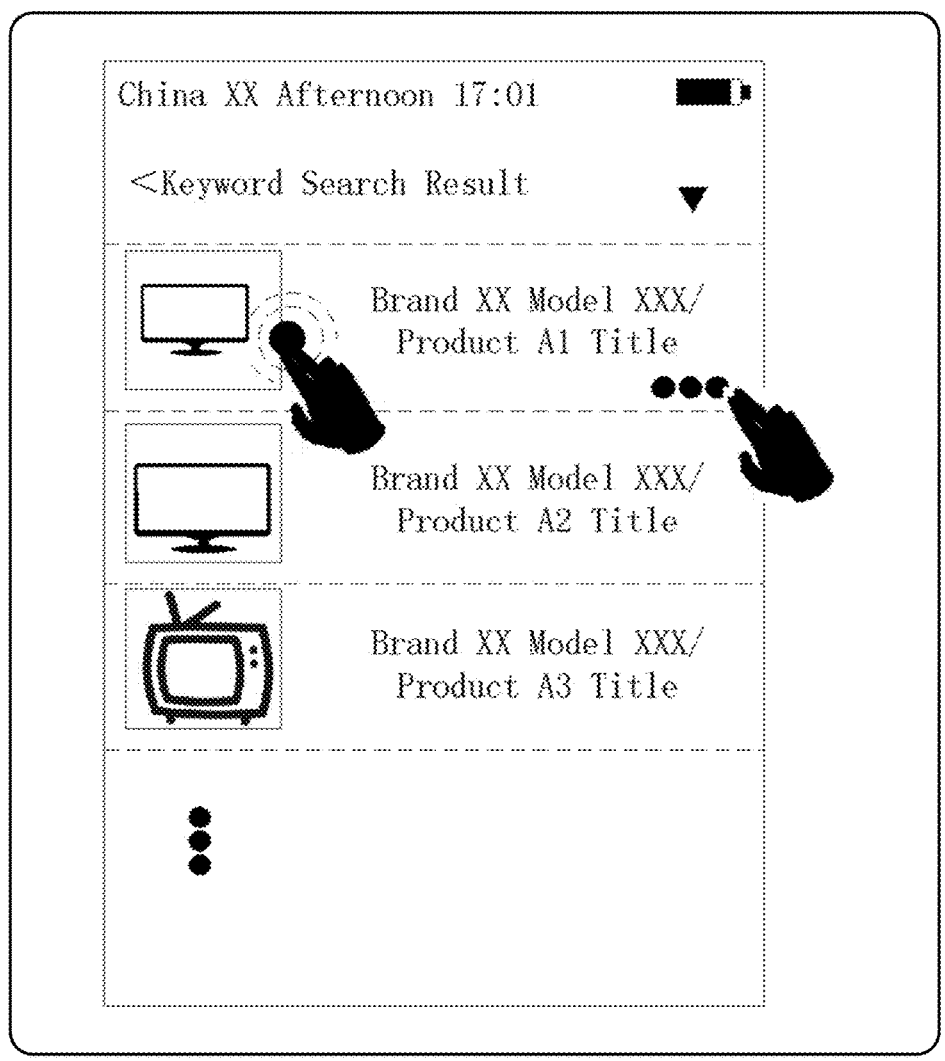
FIG. 8 is a schematic diagram of preset trigger conditions in an example embodiment of the present application.

As described in the above example embodiments, the preset trigger condition may be set in advance based on the expected behavior of the user operation. For example, it could be clicking on a display window three times within one second, tracing a circle around the display window, or long pressing a product photo or title for more than 1.5 seconds, and so on. Another embodiment of the present application for preset trigger condition may be more consistent with the user purchasing habits. Interactive user experience can be further improved. Specifically, an example embodiment of the present application provides a method of displaying user specified information, the preset trigger conditions may include at least one of the following:

long press time in the target data item display window is greater than or equal to a preset threshold time;

trigger a user specified information pop up button in the target data item display window;

Of course, as described above, the preset trigger conditions may be set differently without any creative efforts. Variations or extensions of the preset trigger condition method shall all fall within the protection scope of the present application. FIG. 8 is a schematic diagram of preset trigger conditions in example application scenarios. As shown in FIG. 8, in a data item search interface, the user may long press a data item, (greater than or equal to the threshold time, such as for 1.5 seconds), or click on a user specified information pop up button at the bottom right corner in the target data item display window " . . . " (virtual keys), then a pre-designed information interface, corresponding to the operated target data item, will be displayed on top of the data item search interface. If the target data item is a non-standard product, the displayed user specified information on the information interface is product image of the target data item. In other embodiments, the information interface can be popped up by other customized user operations, such as users draw a circle in the display window. If the preset information interface popup trace is included in the circle, then the information interface may pop up.

Figure 9:
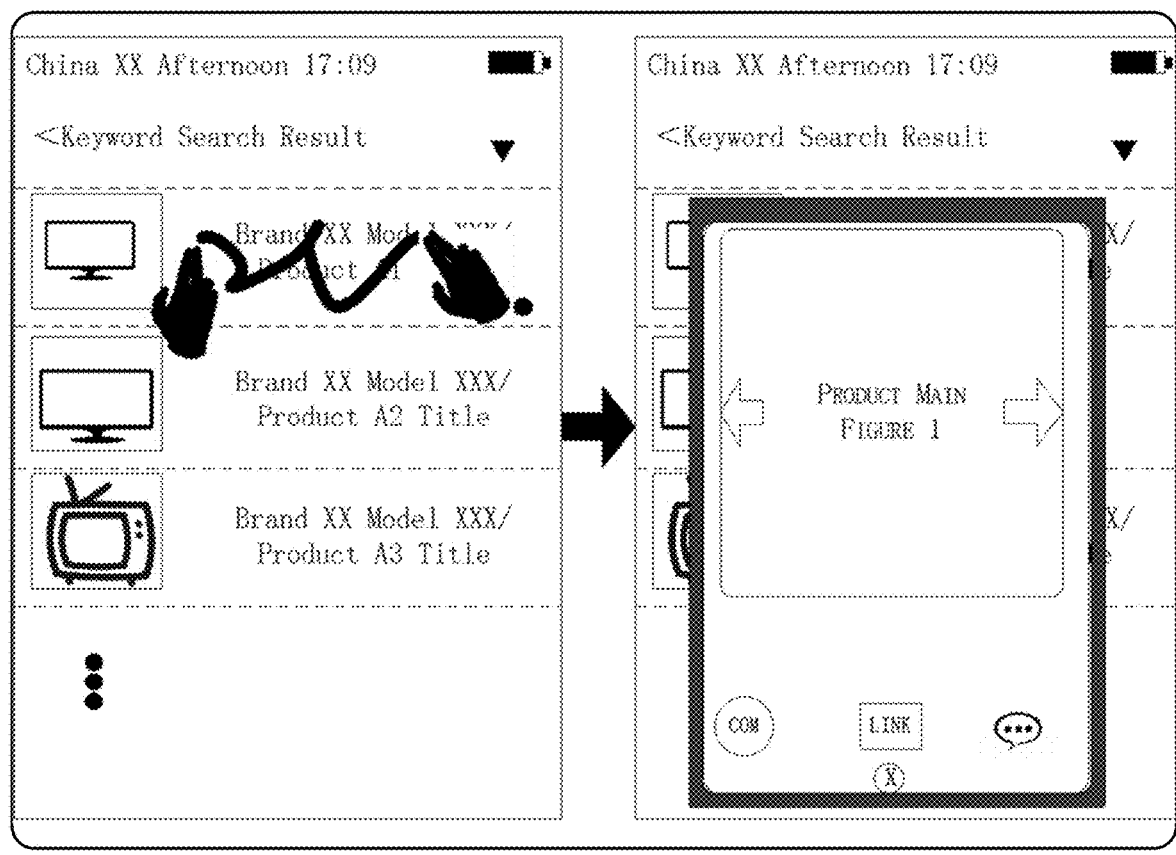
FIG. 9 is a schematic diagram of an application scenario for presenting user specified information of data item according to an example embodiment of the present application.

FIG. 9 is a schematic diagram of an application scenario 900 for presenting user specified information of data item according to an example embodiment of the present application. As shown in FIG. 9, another embodiment of the present application, the preset trigger conditions may include:

identifying that the control sliding trace matches the preset information interface popup trace;

Accordingly, obtaining item information of the target data items from at least one data source may include: determining the category of the user specified information to be displayed in the information interface according to the control sliding trace, obtaining item information of the target data items according to the determined category of the user specified information from at least one data source.

Specifically, as shown in FIG. 9, multiple preset information interface popup traces can be provided in advance. When the user's control sliding trace matches any one of the present information interface popup traces, the trigger condition is met. The one or more preset information interface popup traces can be set corresponding to categories of user specified information, such as the different categories of pictures, and parameters. For examples, when the user slides a trace of "P", it may indicate that the user needs the picture category of the user specified information. When the user slides a trace of "W", it may indicate that the user needs the parameter category of the user specified information. Therefore, when the user's control sliding trace met a trigger condition, the category of user specified information requested by the user can be determined according to the shape of the trace. The user specified information to be displayed in the information interface can be determined based on the categories of the user specified information that the user needs. Of course, this is merely an example embodiment according to the present application. It does not exclude any other way to identify the user specified information based on other information. For example, when the user slides a trace of "V", it may indicate that the user needs the video category of the user specified information.

With the present embodiment, the application can set a variety of different preset trigger conditions; can also set displaying different user specified information based on different preset trigger conditions, and make the user interaction interface more flexible. Users can have multiple user-friendly ways to popup the information interface. Thus users can obtain different types of user specified information fast and conveniently. It enables the users filtering data item information fast, and enhances the interactive user experience and data item purchasing experience.

As shown above, besides the user specified information of a target data item, the information interface may also include other auxiliary information of the data item, such as, place of origin, date on the market, and so on. In one embodiment of the present application, the information interface may include only the user specified information set in advance in the target data items, such as the main image, the key parameters, the main focus information. This method to determine the user specified information removes most of the auxiliary information. This method removes less impact information by focusing on the user specified information for the target data item. Only user specified information of data items is displayed to the user. It enables users to quickly locate user specified information of target data items. These user specified information of the target data item can be displayed in the main display area on the information interface. In another example embodiment of the processing method, guide information may also be introduced for a single target data item in the information interface, such as evaluations from experienced users, the UGC content (the User Generated Content), word of mouth, the data item picture, test reports, and so on. From different point of views, including: consumers, businesses, media, and experienced users, it provides attached information and more transparent information of the target data item to help consumers to learn more about the data item information. Accordingly, in another example embodiment of the present application, the information interface can be designed structurally to include user specified information and also one or more extended function areas. Guidance information of the target data item can be provided in the extended function areas. It provides users multi-dimension information fast and conveniently. Specifically, in another example embodiment of the present application, generating an information interface further comprises: providing at least one guidance information of the target data item in the information interface.

Figure 10:
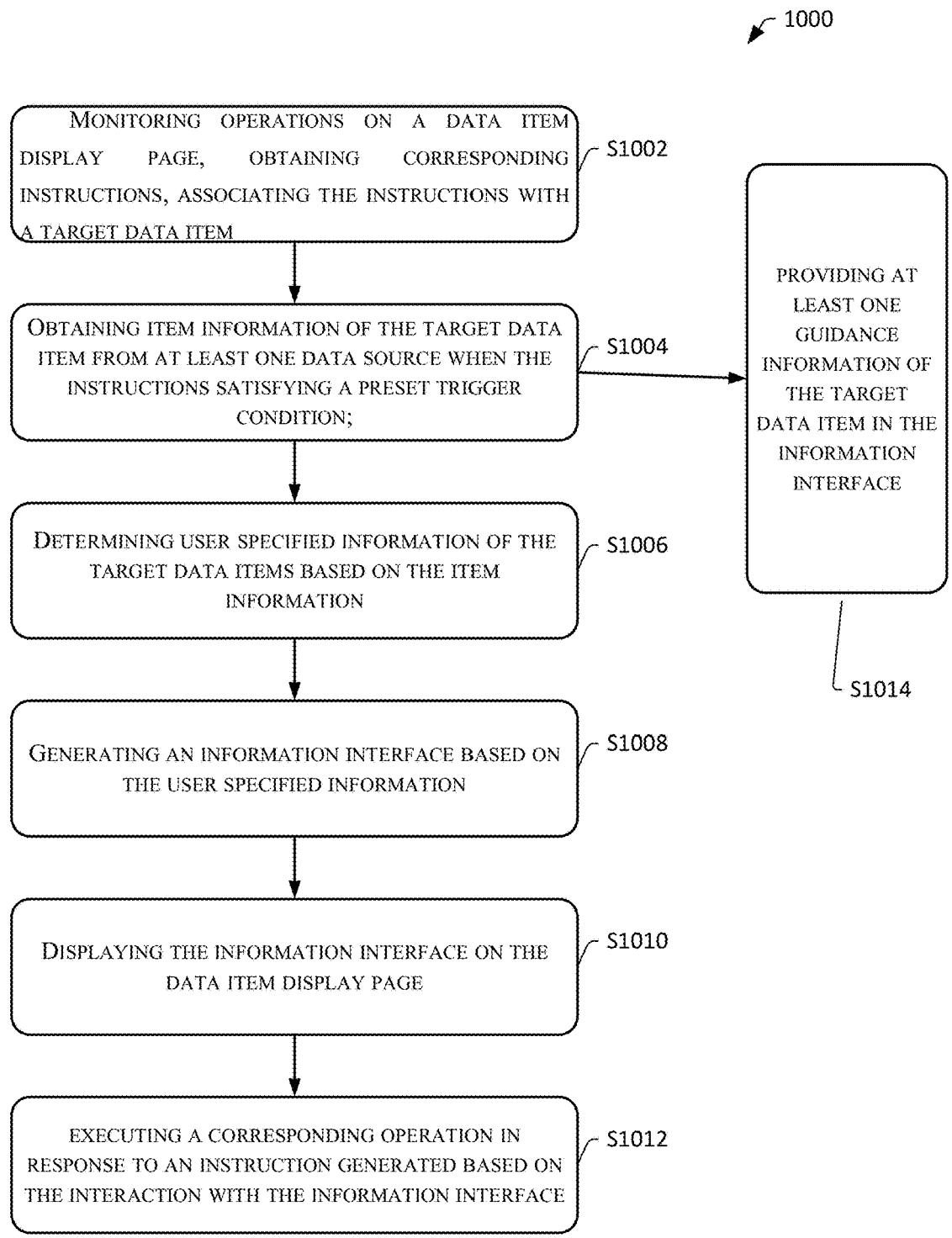
FIG. 10 is a flowchart of a method for presenting user specified information of data item according to another example embodiment of the present application.
Figure 11:
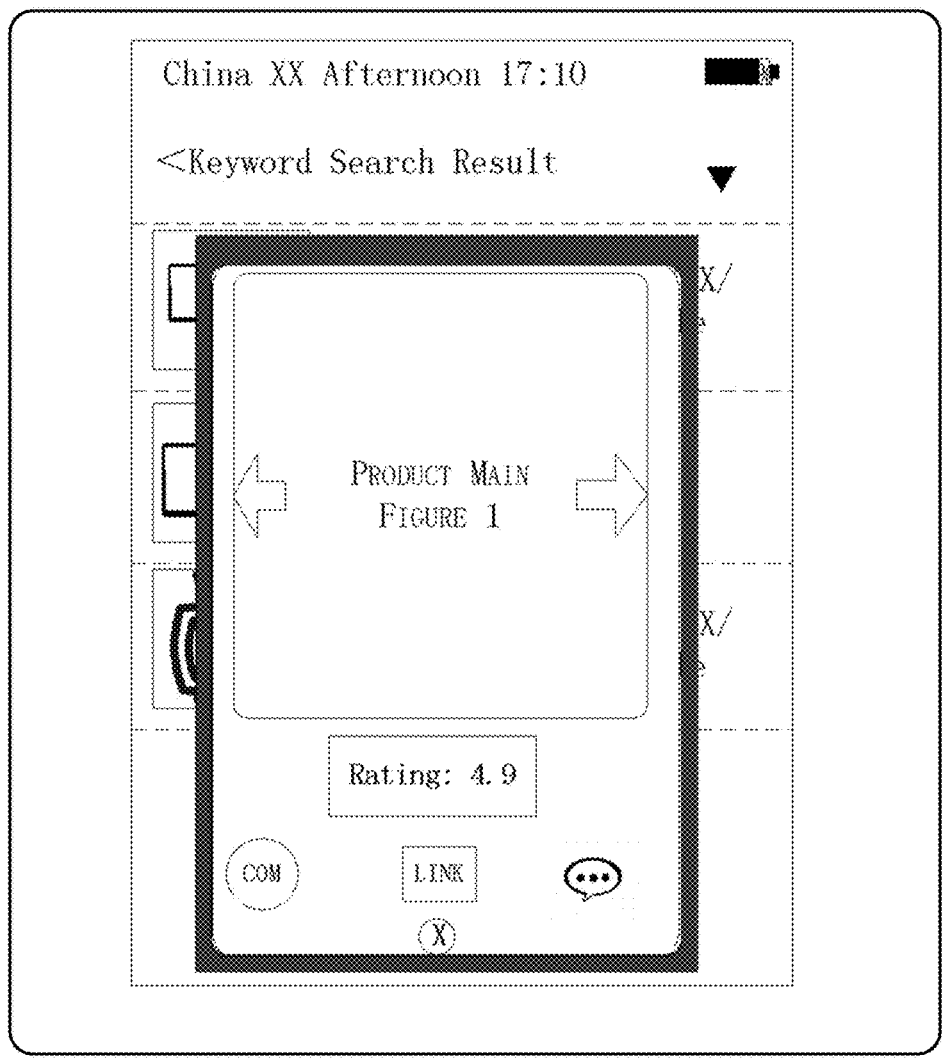
FIG. 11 is a schematic diagram of an application scenario for presenting guidance information of a target data item in an information interface according to an example embodiment of the present application.

FIG. 10 is a flowchart of a method 1000 for presenting user specified information of data item according to another example embodiment of the present application. Steps S1002-S1012 correspond to S402-S412 in FIG. 4. Details of S1002-S1012 can be referenced to S402-S412, and are not repeatedly described herein. Furthermore, the method 1000 further includes providing at least one guidance information of the target data item in the information interface at S1014. It provides an embodiment to include guidance information of a single target data item. The guidance information can be displayed in an area in the information interface with the user specified information, such as just below. The guidance information can be displayed in whole or partially in the information interface. FIG. 11 is a schematic diagram of an application scenario for presenting guidance information of a target data item in an information interface 1100 according to an example embodiment of the present application. As shown in FIG. 11, a user can long press to pop up the information interface, the user can browse the main display window to view of the main picture (user specified information). Below the main content display area of the target data, guidance information is displayed, such as word of mouth Rating: 4.9. Thus, the user does not need to enter the data item details page. The user may just long press a key to popup the information interface, the interface includes the user specified information of the data item, but also can include the guidance information, such as the common evaluation from other buyers, relatively objective information to guide the user. The user may make purchase decision fast based on the user specified information of the target data item. For example, several main figures showing the effect of the target data item, more satisfied users, and a high reputation score of 4.9 points (out of 5 points). If they meet the needs of the user, the user can navigate back to the item display page and further browse the data item details page. However, if the target data item reputation score is low, such as only 4.2 points, even if the main figures looks good, the user may not purchase the data item, and return to the data item display page to continue browsing to view other data items.

In the application scenario of the present example embodiment, the guidance information to influence the decision of a buyer is reputation score. In other embodiments, the guidance information may be a combination of one or more other guidance information, such as the evaluation information from particular users (such as evaluation), data item trial report, data item video, and so on. In an example embodiment of the present application, the guidance information may comprise at least one of the following:

rating information of the target data item;

trial report information of the target data item;
public evaluation report matched the target data item;
particular customers' evaluation matched the target data item;
obtained customized information of the data item.

Figure 12:
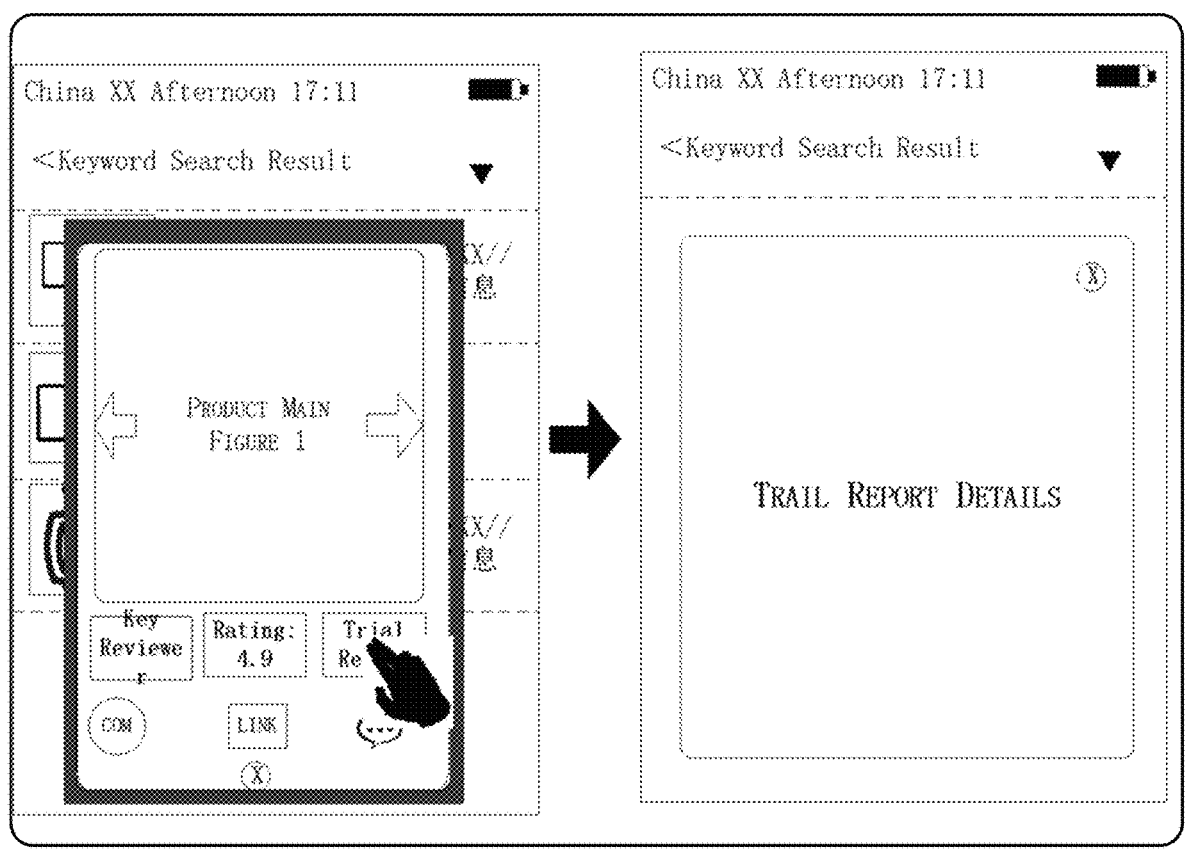
FIG. 12 is a schematic diagram of an application scenario for presenting guidance information of a target data item in an information interface according to another example embodiment of the present application.

FIG. 12 is a schematic diagram of an application scenario for displaying guidance information of a target data item in an information interface 1200 according to another example embodiment of the present application. In FIG. 12, the guidance information set in the extended area may further include the evaluation from particular customers and trial reports. Evaluation from particular customers can be obtained from server based on calculation according to certain matching criteria. For example, if the target data item has an evaluation from a particular customer, the evaluation is selected and displayed in the extended area of the information interface; if the target data item has multiple evaluations from multiple customers, the evaluations to be displayed is selected by evaluating the reputation of the particular customers. The user can view the content of the evaluation directly on the information interface. When the content of the evaluation is too long, only part of the evaluation is displayed. If the user needs to view the complete evaluation, the user can press corresponding content display area in the information interface. The display will jump to evaluation details page or trail report details page. For the guidance information, such as test reports, a corresponding navigation path can be set on the information interface, such as setting a link to view trial reports. When the user clicks on the link, the display jumps to the trial report's detail page.

To be noted, when the user specified information includes multiple guidance information, the multiple guidance information can be provided alternatively in the extended area of the information interface.

In the above example embodiment, public evaluation report can be evaluations from the data items consumers. The public evaluations can be rated by supporting rate, or most recent published to match the publication evaluation information displayed on the information interface. When the guidance information is evaluations from particular customers, the particular customers may be graded by reputation, or supporting rate. In other embodiments, information customized by businesses or designers may be added as guidance information. For example, businesses may add customized display information of "water server" in a water heater product interface.

In the present example embodiment, one or more guidance information for an individual target data item can be introduced on the information interface. From different points of view, including: consumers, businesses, media, and experienced users, it provides attached information and more transparent information of the target data item to help consumers to learn more about the data item information. The example embodiment of the present application provides streamlined user specified information of the data items (different attribute categories of data items may have different information to display) to help consumers to make quick decision. It makes the content of more valuable products emerge, enables users to obtain user specified information of the target data item fast and efficiently, and also provides guidance information to help consumers to made decisions.

Figure 13:
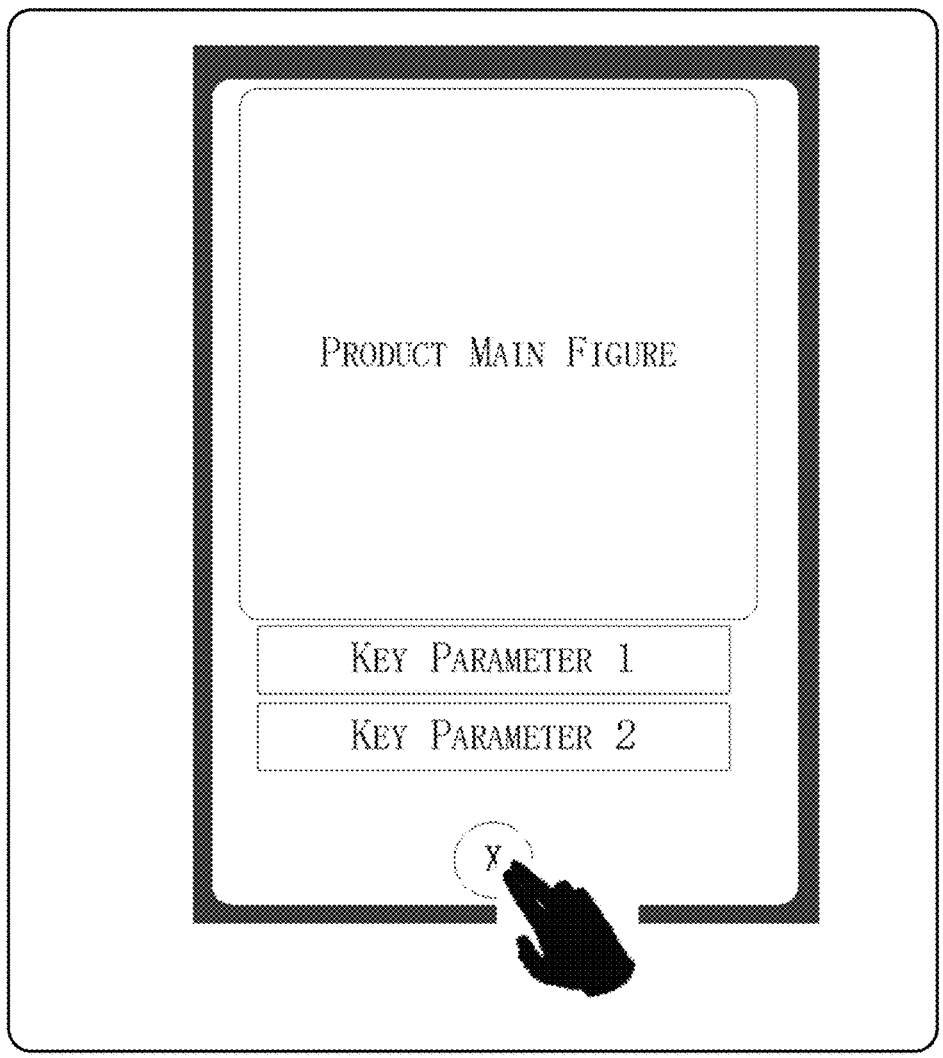
FIG. 13 is a schematic diagram of a layout of an information interface according to an example embodiment of the present application.
Figure 14:
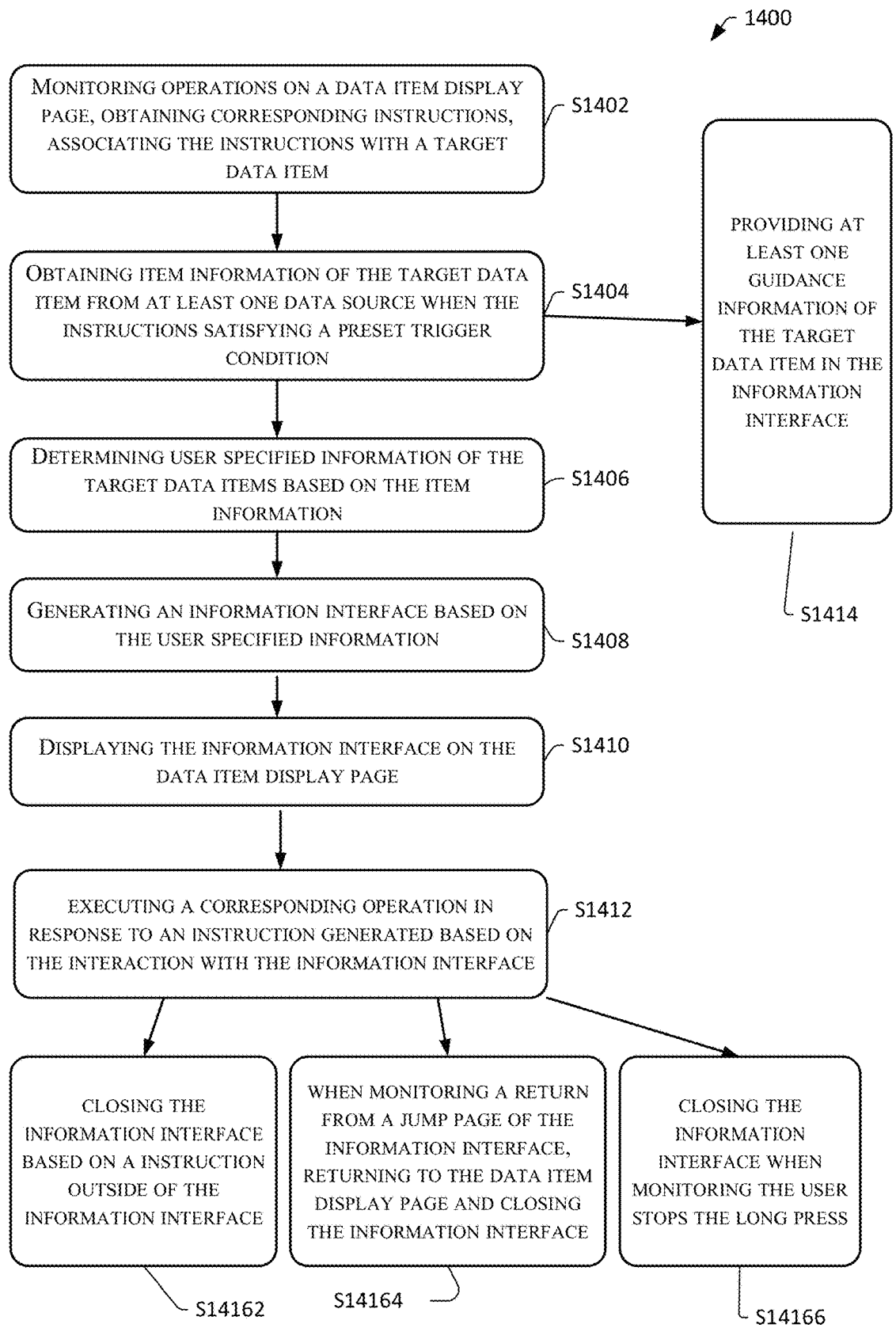
FIG. 14 is a flowchart of a method for presenting user specified information of a data item according to another example embodiment of the present application.

Generally, a key to exit may be provided and displayed on the information interface. A user can click on the key to exit the information interface and return to the data item display page. FIG. 13 is a schematic diagram of a layout of an information interface 1300. An "X" shape exit button may be provided at the bottom of the information interface. When the user clicks on the "X" button, the information interface is closed and the display returns to the data item display page. In an example embodiment of the present application, a method of displaying user specified information provides an alternative of interactive information interface. FIG. 14 is a flowchart of a method for presenting user specified information of a data item according to another example embodiment of the present application. As shown in FIG. 14, the method may further comprise at least one of the following steps:

Step 14162: closing the information interface based on a control instruction outside of the information interface;

Step 14164: when monitoring a return from the jump page of information interface, returning to the data item display page and closing the information interface.

Figure 15:
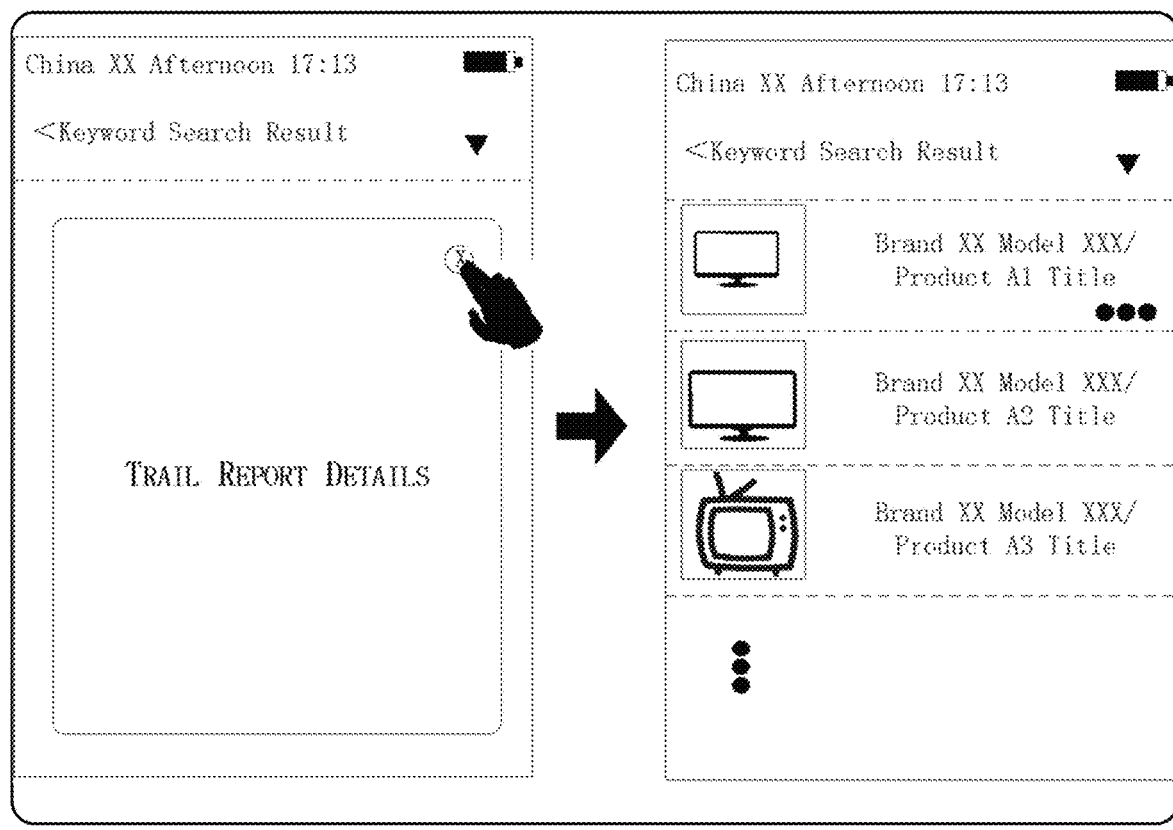
FIG. 15 is a schematic diagram of an application scenario for exiting an information interface according to another example embodiment of the present application.

FIG. 15 is a schematic diagram of an application scenario for exiting an information interface 1500 according to another example embodiment of the present application. Jump pages of the information interface may include pages which are connected to links on the information interface, such as the trial report information page of a data item. When a user finished viewing the trial report, the display may close the trial report detail page and return to the data item display page.

In another embodiment, the display can set to close the information interface when monitoring a key click outside of the information interface display area.

In an example embodiment of a processing method for displaying user specified information of a data item, the preset trigger conditions may include long press. When the user long press time exceeds a preset threshold, the information interface may be displayed on top of the data item display page. When long press stopped, the information interface may be closed. Specifically, in another example embodiment of the present application, when the preset trigger condition comprises a length of time for long press in the data item display window of the target data item is longer than or equal to the threshold, the method further includes:

Step 14166: closing the information interface when monitoring the user stops the long press;

The above embodiment comprises Step 14162, Step 14164, Step 14166, the mechanism to exit the information interface. The mechanism to exit the information interface may be set differently without any creative efforts. Variations or extensions of the preset trigger condition method shall all fall within the protection scope of the present application. The present application provides yet another embodiment of a method for presenting user specified information. In another embodiment, the user can use preset operations, such as long press, to display one or more information guidance selections on the data items display page. The user can click on a guidance selection to browse details of the information of the data item. Specifically, another embodiment of the present application provides a processing method for displaying user specified information of data item, the method includes:

monitoring operations on a data item display page, obtaining corresponding instructions, associating the instructions with a target data item;

when the instructions satisfying a preset trigger condition, displaying at least one category of information guidance selection of the target data item on the data item display page, the information guidance selection options are generated according to determined user specified information of the target data item based on item information of the target data item, wherein the item information is obtained from the target data item from at least one data source, and also according to the category of the user specified information;

when the information guidance selection option is triggered, navigating to the corresponding information display page.

Figure 16:
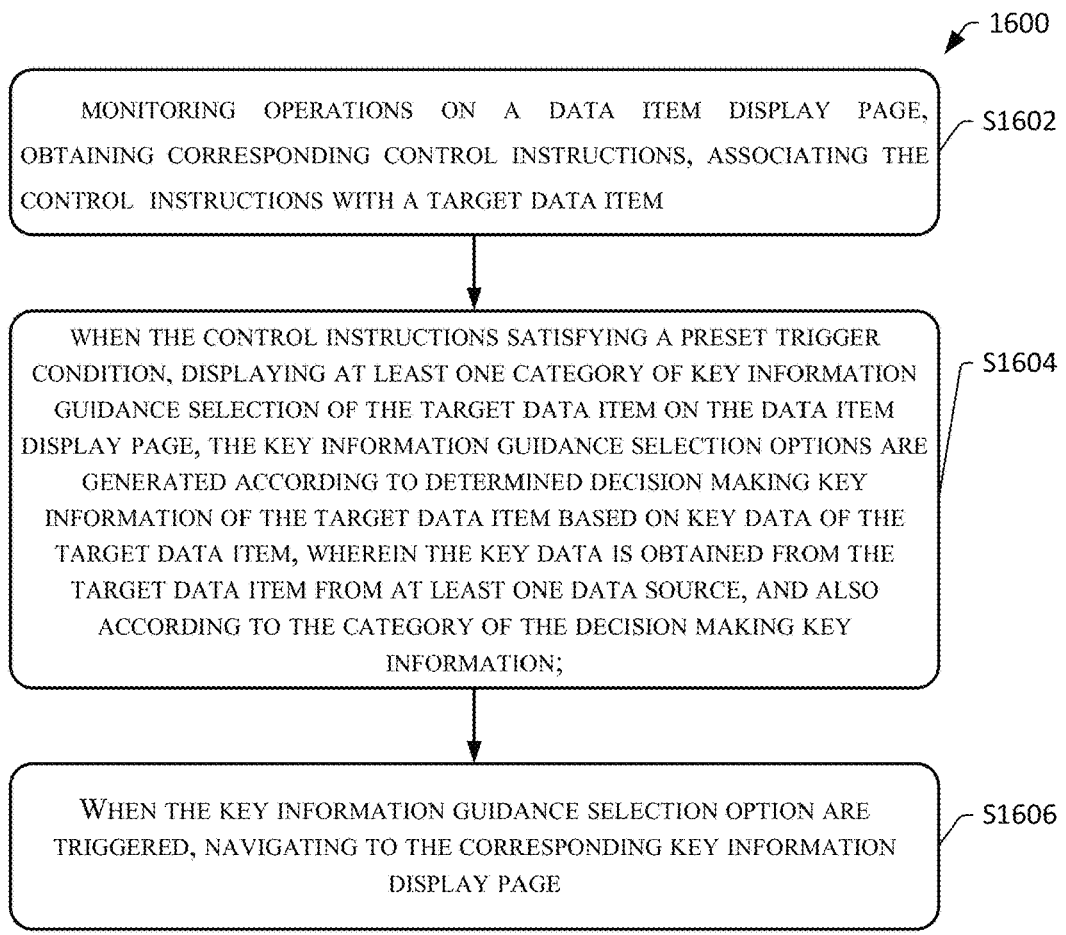
FIG. 16 is a flowchart of a method for presenting user specified information of a data item according to another example embodiment of the present application.

FIG. 16 is a flowchart of a method for presenting user specified information of a data item according to another example embodiment of the present application. In implementations, the method includes:

Step 1602: monitoring operations on a data item display page, obtaining corresponding instructions, associating the instructions with a target data item;

Step 1604: when the instructions satisfying a preset trigger condition, displaying at least one category of information guidance selection of the target data item on the data item display page, the information guidance selection options are generated according to determined user specified information of the target data item based on item information of the target data item, wherein the item information is obtained from the target data item from at least one data source, and also according to the category of the user specified information;

Step 1606: When the information guidance selection option are triggered, navigating to the corresponding information display page.

In the present embodiment, the user specified information of the data item may be divided into different categories. For example, the user specified information can be user specified information category of a data item (pictures of a data item and parameters of a data item can be divided into different categories of user specified information); the trial report may be one category of the user specified information; reputation of the data item may be another category of the user specified information. For example, in a search scenario, when the user presses a data item in the data item display page, multiple information guidance selections may be available to the user. When the user trigger an information guidance selection, corresponding category of the user specified information page may be displayed. It provides users the user specified information fast and efficiently. In a specific embodiment, implementations of the preset trigger condition, the user specified information of the data item, the mechanism for page jump, are not repeated here. Please refer to other embodiments described in the application. With the present application, the user may obtain corresponding categories of the user specified information of a data item. The method can lower the cost of decision making based on information noise reduction, optimize user data item information interactive experience, and improve user data item purchase experience.

Figure 17:
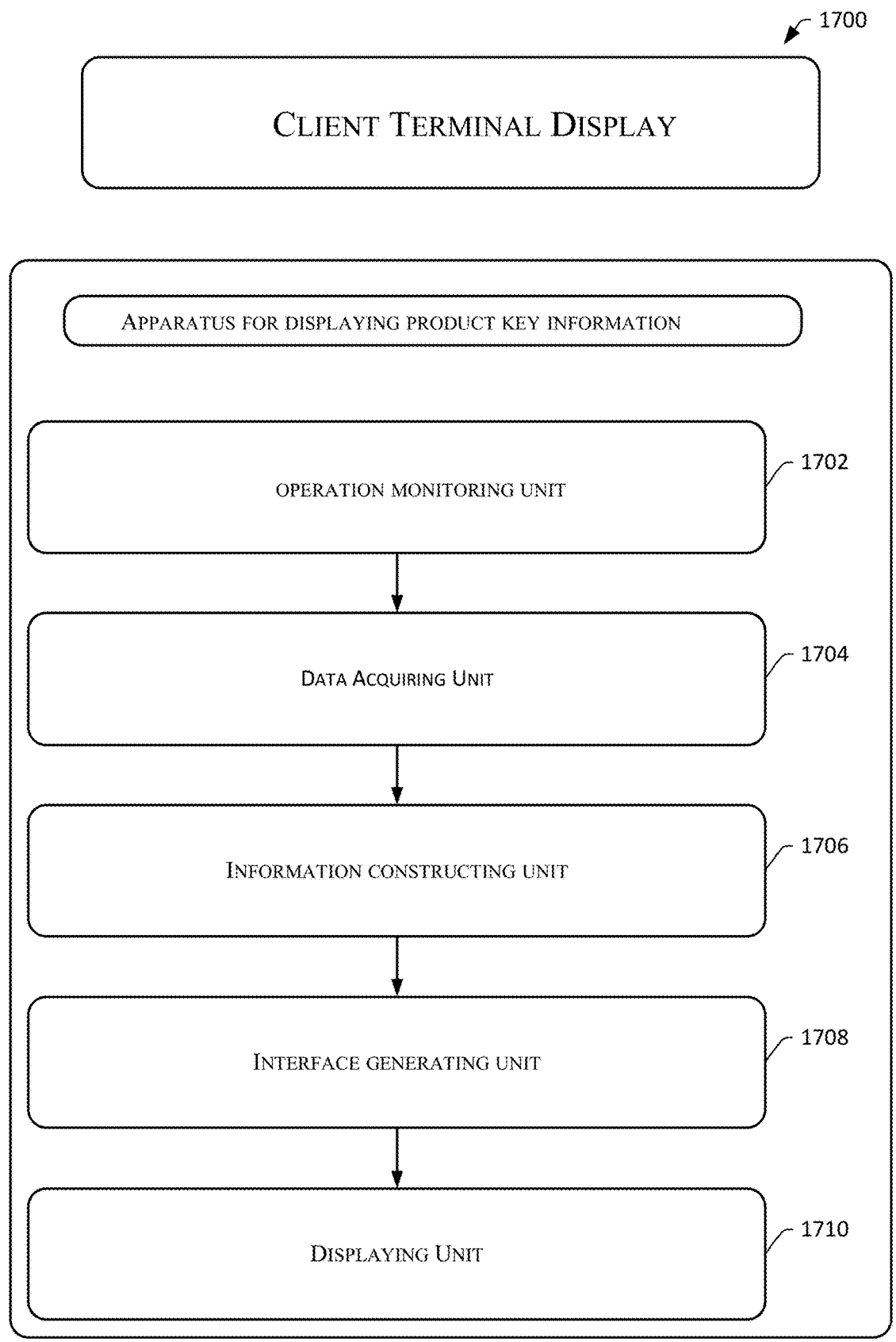
FIG. 17 is a schematic structural diagram of a processing apparatus for displaying user specified information of a data item according to an example embodiment of the present application.

Based on the processing method for displaying user specified information of data item in the present application, the present application provides a processing apparatus for displaying user specified information of data item. FIG. 17 is a schematic structural diagram of a processing apparatus 1700 for displaying user specified information of a data item according to an example embodiment of the present application. As shown in FIG. 17, the processing apparatus 1700 includes:

operation monitoring unit 1702: configured to determine a user operation associated with a target data item on a data item display page;

data acquiring unit 1704: configured to obtain item information of the target data item from at least one data source when an instruction satisfying a preset trigger condition;

information constructing unit 1706: configured to determine user specified information of the target data item based on the item information;

interface generating unit 1708: configured to generate an information interface based on the user specified information;

displaying unit 1710: configured to display the information interface on the data item display page.

Figure 18:
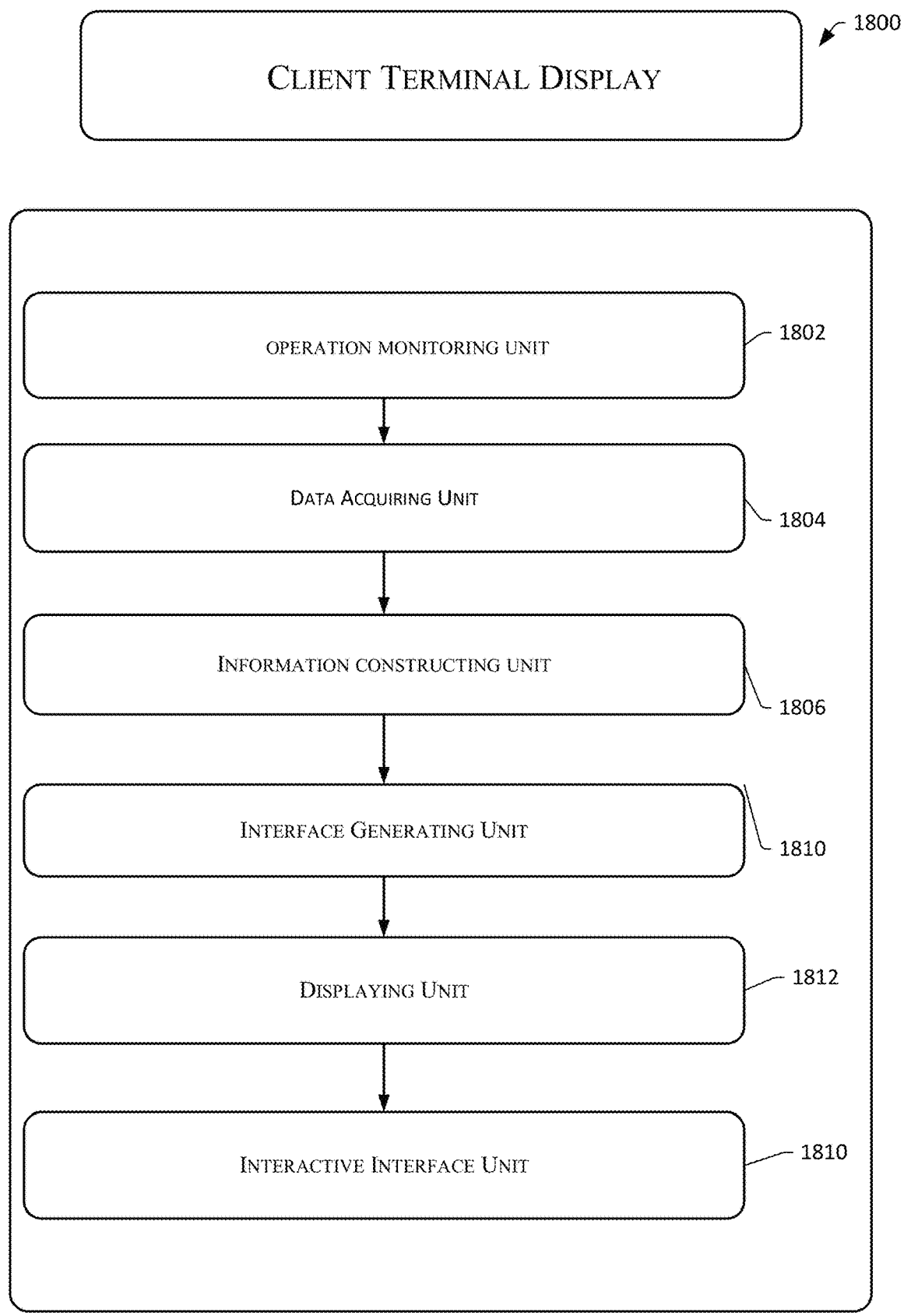
FIG. 18 is a schematic structural diagram of a processing apparatus for displaying user specified information of a data item according to another example embodiment of the present application.

FIG. 18 is a schematic structural diagram of a processing apparatus 1800 for displaying user specified information of a data item according to another example embodiment of the present application. As shown in FIG. 18, the apparatus 1800 may further comprise:

interactive interface unit 1814: configured to execute a corresponding operation in response to an instruction generated based on the interaction on an information interface.

In another example embodiment of the present application, the interface generating unit 1808 may also be used to provide at least one guidance information of the target data item on the information interface.

In yet another example embodiment of the present application, the data acquiring unit 1804 configured to obtain item information of the target data item from at least one data source further includes:

determining a category of the user specified information to be displayed based on the category of the target data item;

obtaining item information corresponding to the category of the user specified information from one or more data resources based on the category of the user specified information.

In yet another example embodiment of the present application, the information constructing unit 1806 configured to determine user specified information of the target data item based on the item information further includes:

combining the item information based on the corresponding categories of user specified information;

generating the user specified information of the target data item.

In another example embodiment of the present application, the interface generating unit 1708 configured to generate an information interface based on the user specified information includes:

placing the user specified information to a corresponding display window of the information interface template;

generating an information interface of the target data item.

The present application provides apparatus for displaying user specified information of data item. The apparatus can be implement differently, such as, based on operations in response to control instructions, different user specified information for different categories of data items, different ways to set the preset trigger conditions, different types of guidance information, different mechanisms to exit the information interface, and so on. Please refer to other embodiments described in the application.

The present application provides apparatus for displaying user specified information of data items. Users may use simple operations, such as long press or click, to pop up an information interface over a data item display page. The information interface could be generated based on the user specified information of target data items. The present application provides flexible, effective user specified information to users directly. With the information interface, obtained after information noise reduction, users do not need to navigate the detailed product page to browse complicated information. Therefore, the present application provides a pop up information interface with user specified information of the data items, over the data item display page. It enables users to obtain user specified information fast and directly. It lowers the cost of decision making based on information noise reduction, optimizes user data item information interactive experience, and improves user data item purchasing experience.

Figure 19:
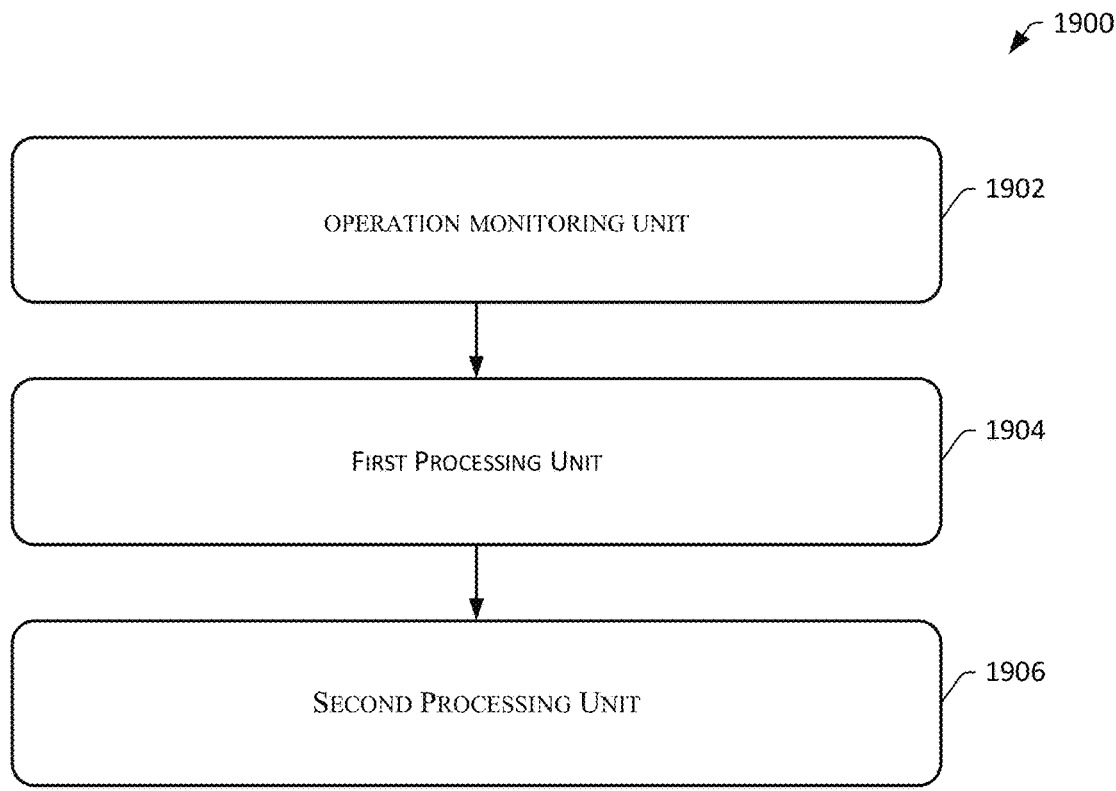
FIG. 19 is a schematic structural diagram of a processing apparatus for displaying user specified information of a data item according to another example embodiment of the present application.

FIG. 19 is a schematic structural diagram of a processing apparatus 1900 for displaying user specified information of a data item according to another example embodiment of the present application. As shown in FIG. 19, the apparatus 1900 comprises:

an operation monitoring unit 1902: configured to monitor operations on a data item display page, and obtain corresponding control instructions, associating the control instructions with target data items;

a first processing unit 1904: configured to, when an instruction satisfying a preset trigger condition, display at least one category of information guidance selections of the target data item on the data item display page, the information guidance selection options are generated according to determined user specified information of the target data item based on item information of the target data item, wherein the item information is obtained from the target data item from at least one data source, and also according to the category of the user specified information;

a second processing unit 1906: configured to, when the information guidance selection option is triggered, navigate to the corresponding information display page.

In the present embodiment, the user specified information of the data item may be divided into different categories. For example, the user specified information can be user specified information category of a data item (pictures of a data item and parameters of a data item can be divided into different categories of user specified information); the trial report may be one category of the user specified information; reputation of the data item may be another category of the user specified information. For example, in a search scenario, when the user presses a data item in the data item display page, multiple user specified information guidance selections may be available to the user. When the user trigger an information guidance selection, corresponding category of the user specified information page may be displayed. It provides users the user specified information fast and efficiently. In a specific embodiment, implementations of the preset trigger condition, the user specified information of the data item, the mechanism for page jump, are not repeated here. Please refer to other embodiments described in the application. With the present application, the user may obtain corresponding categories of the user specified information of a data item. The embodiment can lower the cost of decision making based on information noise reduction, optimize user data item information interactive experience, and improve user data item purchase experience.

The present application provides methods, apparatus for displaying user specified information of data item. It can be used in multiple client terminals, such as mobile phones, tablets, self-service terminals, PC terminals, the vehicle-mounted computers, servers, etc. It can lower the cost of decision making based on information noise reduction, optimize user data item information interactive experience, and improve user data item purchase experience. The present application provides a client terminal, the client terminal includes:

a display unit configured to display a data item display page;

a sensor unit configured to obtain operations on the data item display page;

a processing unit, coupled to the display unit and the sensor unit, configured to:
  determine a user operation associated with a target data item on the data item display page,
  obtain item information of the target data item from at least one data source when an instruction satisfying a preset trigger condition,
  determine user specified information of the target data item based on the item information, and
  generate an information interface based on the user specified information; and the display unit further configured to display the information interface on the data item display page.

The present application provides client terminals for displaying user specified information of data item. It enables users to obtain user specified information fast and directly. It lowers the cost of decision making based on information noise reduction, optimizes user data item information interactive experience, and improves user data item purchase experience.

In another example embodiment, the information interface on the client terminal may interact with the user, response to the user's operations on the information interface. In another embodiment of the present application, the processor configured to perform a corresponding operation in response to an instruction generated based on the interaction with the information interface comprises at least one of the following:

switching the user specified information on the information interface in response to an interactive instruction;

when triggering a link on the information interface, jumping to the corresponding linked target page;

when triggering media key, play the corresponding media information.

In another example embodiment, the display unit may be further configured to close the information interface. For example, the user may touch anywhere on the display unit which is outside of the information interface to close the information interface of the target data item. Or, when the user is browsing a jump page of the information interface, the display unit may close the information interface and return to the data item display page when the user returns from the jump page of the information interface. Specifically, in another example embodiment, the processor may be further configured to at least one of the following operations:

closing the information interface based on a control instruction outside of the information interface;

when detecting the return from a jump page of the information interface, returning to the data item display page and closing the information interface.

The present application provides client terminal for displaying user specified information of data item. The client terminal can be implement differently, such as, based on operations in response to control instructions, different user specified information for different categories of data items, different ways to set the preset trigger conditions, different types of guidance information, different mechanisms to exit the information interface, and so on. Please refer to other embodiments described in the application.

The present application further provides a client terminal, the client terminal includes:

A display unit configured to display a data item display page;

A sensor unit configured to obtain operations on the data item display page;

A processor, coupled to the display unit and the sensor unit, configured to determine instructions corresponding to the operations, the instructions are associated with target data items, when the instructions satisfying a preset trigger condition, display at least one category of information guidance selection of the target data items on the data item display page, the information guidance selection options are generated according to determined user specified information of target data items based on item information of the target data items, wherein the item information is obtained from the target data items from at least one data source, and also according to the category of the user specified information; and The display unit further configured to, when the information guidance selection options are triggered, navigate to the corresponding information display page.

The information guidance selection also has corresponding exit mechanism. In another example embodiment of the present application, the processor may be further configured to at least one of the following operations:

closing the information guidance selection options based on an instruction outside of the information guidance selection display area;

when detecting the return from a jump page of the information interface, returning to the data item display page and closing the information guidance options.

Figure 20:
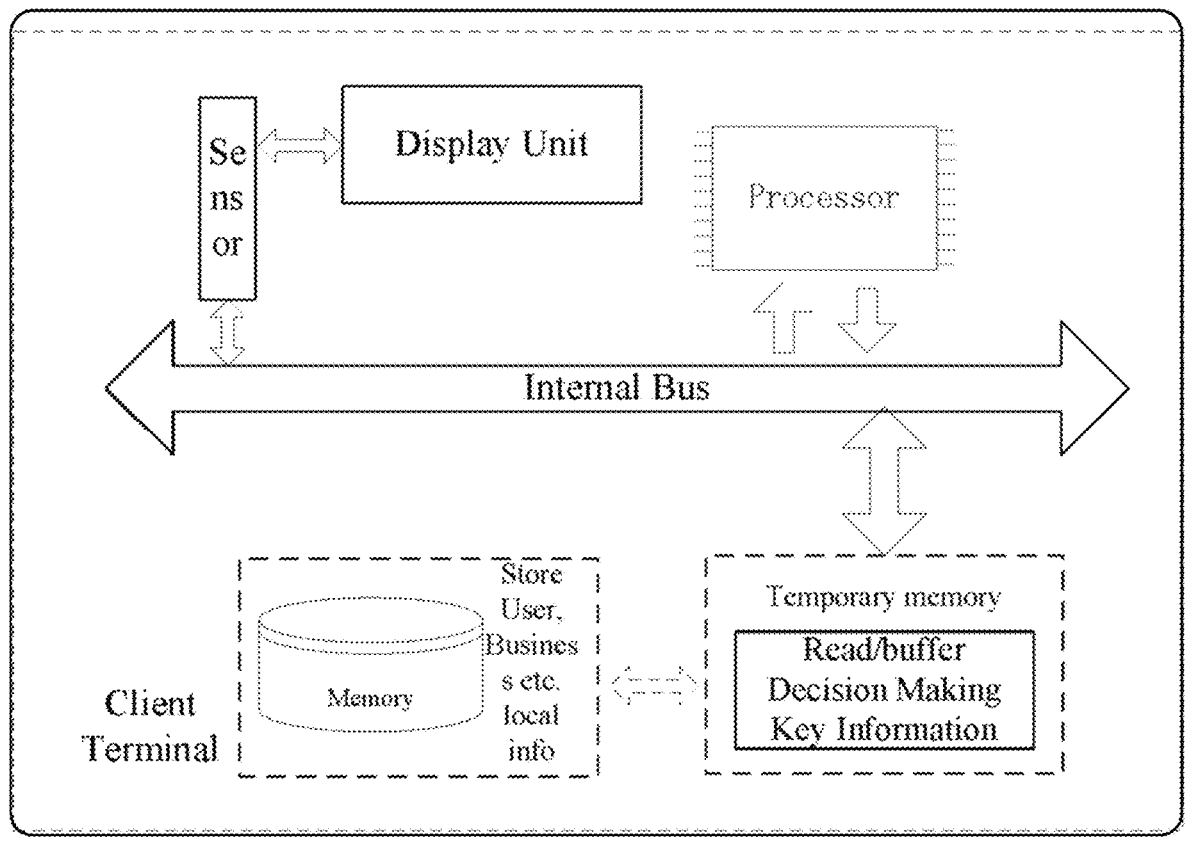
FIG. 20 is a schematic structural diagram of a client terminal according to an example embodiment of the present application.

FIG. 20 is a schematic structural diagram of a client terminal 2000 according to an example embodiment of the present application. The apparatus or client terminal provided in this application may utilize, but is not limited to, java language, including, but not limited to, android or iOS system in combination with necessary hardware embodiment.

The present application provides client terminal for displaying user specified information of data item. The client terminal may be implement differently, such as, based on operations in response to control instructions, different user specified information for different categories of data items, different ways to set the preset trigger conditions, different types of guidance information, different mechanisms to exit the information interface, and so on. Please refer to other embodiments described in the application.

The present application provides client terminals for processing methods or apparatus for displaying user specified information of data items. Users may use simple operations, such as long press or click, to pop up an information interface over a data item display page. The information interface could be generated based on the user specified information of target data items. The present application provides flexible, effective user specified information to users directly. With the information interface, obtained after information noise reduction, users do not need to navigate the detailed product page to browse complicated information. Therefore, the present application provides a popup information interface with user specified information of the data items, over the data item display page. It enables users to obtain user specified information fast and directly. It lowers the cost of decision making based on information noise reduction, optimizes user data item information interactive experience, and improves user data item purchasing experience.

Figure 21:
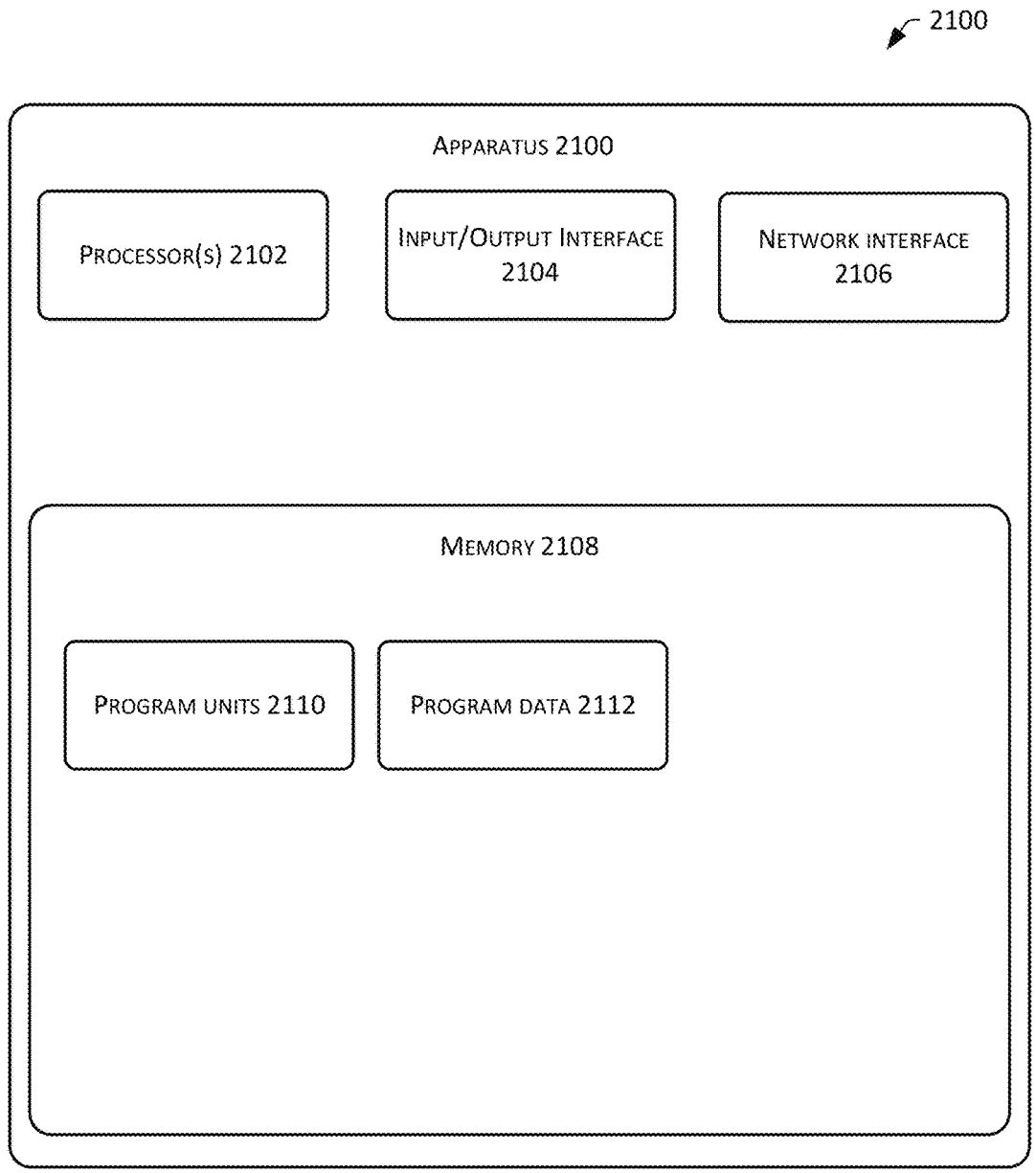
FIG. 21 is a structural diagram of an example apparatus according to an example embodiment of the present application.

In a typical configuration, the client terminals and apparatus include one or more processors (CPUs), an input/output interface, a network interface, and a memory. FIG. 21 is a structural diagram of an example apparatus according to an example embodiment of the present application. FIG. 21 shows an example apparatus 2100 such as the apparatuses in FIGS. 17 and 18. The apparatus 2100 may include one or more processors 2102, an input/out interface 2104, a network interface 2106, and memory 2108.

The memory 2108 may include a volatile memory, a random access memory (RAM) and/or a non-volatile memory or the like in a computer readable medium, for example, a read-only memory (ROM) or a flash RAM. The memory 2108 is an example of the computer readable medium.

The computer readable medium includes non-volatile or volatile, and movable or non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage apparatus, or any other non-transmission medium, and can be used to store information accessible to the computing device. According to the definition in this text, the computer readable medium does not include transitory media, such as modulated data signals and carriers.

The memory 2108 may include program units 2110 and program data 2112. Depending on which apparatus (e.g., any one of the apparatuses as shown in FIGS. 17 and 18), the program units 2110 may include one or more of the foregoing units as described in the corresponding apparatus.

The present application includes descriptions of information definition, interactive methods, and decisions for setting operations in response to interactive instructions, displaying different user specified information for different categories of data items, mechanism of popup information interface, different categories of guidance information. However, the present application is not limited to industrial communication standards, standard design languages, Android/iOS system standards or example embodiments described in the application. Modification or variation of certain industry standards or customized example embodiments may be implemented to achieve the same, equivalent or similar effect of the present application. Embodiments of these modifications or variations still fall within the scope of the present application.

Specific example embodiments of the present application are disclosed in detail with reference to the descriptions and accompanying drawings, and manners with which the principle of the present application can be employed are specified. It should be understood that the scope of the example embodiments of the present application is not limited thereto. The example embodiments of the present application include numerous variations, modifications and equivalences within the spirit and the scope of terms of the appended claims. A feature described and/or shown for an example embodiment may be used in one or more other example embodiments in an identical or similar manner, be combined with a feature in another example embodiment, or replace a feature in another example embodiment. It should be emphasized that, the term "include/comprise" refers to existence of a feature, assembly, step, or component when used in this text, but does not exclude existence or addition of one or more other features, assemblies, steps, or components.

The units, module, apparatus, devices described in the embodiments may be implemented by computer chips or functions of certain products. For convenience of description, the description of the above apparatus or client terminals is divided into various functional units. In the various embodiments of the present application, functions of different units can be implemented by one or more software and/or hardware. Same function units or modules can be implemented by combining multiple sub-units or sub-modules. The examples embodiments are illustration only. The division of units is logical division, can be implemented differently. For example, multiple units or components can be combined or integrated to another system. Some functions can be omitted or not executed. Furthermore, different units can be coupled directly or indirectly. The coupling could be electrical mechanical or any other forms.

Persons skilled in the art should understand that, the present application may be in the form of a complete hardware example embodiment, a complete software example embodiment, or an example embodiment combining software and hardware. For example, the processor may be in the form of, for example, a microprocessor or a processor and a computer readable medium storing computer readable program codes (for example, software or firmware) executable by the (micro)processor, a logic gate, a switch, an Application Specific Integrated Circuit (ASIC), a programmable logic controller, an embedded micro-controller, and so on. This is not limited in the present application.

The present application may be described in a common context of a computer executable instruction performed by a computer, for example, a program module. Generally, the program module includes a routine, a program, an object, a component, a data structure, and the like for executing a specific task or implementing a specific abstract data type. The present application may also be implemented in distributed computing environments. In the distributed computing environments, a task is performed by using remote processing devices connected through a communications network. In the distributed computing environments, the program module may be in a local and remote computer storage medium including a storage device.

Persons skilled in the art should understand that, the example embodiments of the present application may be provided as a method, a system, or a computer program product. Therefore, the present application may be in the form of a complete hardware example embodiment, a complete software example embodiment, or an example embodiment combining software and hardware. Moreover, the present application may employ the form of a computer program product implemented on one or more computer usable storage media (including, but not limited to, a magnetic disk memory, a CD-ROM, an optical memory, and the like) including computer usable program code.

Various example embodiments in the specification are described in a progressive method. The same or similar parts between the example embodiments may be referenced to one another. In each example embodiment, differences between the example embodiment and other example embodiments are focused and described. The present application is applicable to various universal or dedicated computer system environments or configurations, such as, a personal computer, a server computer, a handheld device or a portable device, a tablet device, a multi-processor system, a microprocessor-based system, a set top box, a programmable consumer electronic device, a network PC, a microcomputer, a mainframe computer, and a distributed computing environment including any of the above systems or devices.

Although the present application is described through example embodiments, those of ordinary skill in the art should know that the present application has many variations and changes without departing from the spirit of the present application, and it is expected that the appended claims cover the variations and changes without departing from the spirit of the present application.

What is claimed is:

1. A method for displaying information of a data item, comprising:
    pre-customizing user specified information associated with a plurality of data items;
    determining a user operation associated with a target data item displayed on a data item display page;
    determining the user operation includes a sliding trace that matches a preset character;
    determining a category of the user specified information corresponding to the preset character;
    obtaining item information of the target data item according to the category from at least one data source;
    determining user specified information of the target data item based on the pre-customized user specified information associated with the target data item by combining one or more items from the obtained item information;
    obtaining at least one guidance information of the target data item, the at least one guidance information providing ratings of the target data item by other users;
    generating an information interface including the user specified information and the at least one guidance information based on the determined user operation associated with the target data item;
    displaying the information interface on the data item display page;
    receiving a user interaction on a link in the user specified information;
    jumping to a target page corresponding to the link in the user specified information; and
    closing the information interface upon detecting a return from the target page.

2. The method of claim 1, further comprising:
    executing a corresponding operation in response to an instruction generated on the information interface.

3. The method of claim 2, wherein the executing a corresponding operation comprises:
    switching the user specified information on the information interface in response to the another instruction;
    when a media key is triggered, playing a corresponding media information.

4. The method of claim 1, further comprising:
    determining that the user operation satisfies a preset trigger condition; and
    determining the user specified information of the target data item from the at least one data source, wherein the preset trigger condition comprises at least one of:
        long press time on the target data item on the data item display page is greater than or equal to a preset threshold time;
        triggering an information interface pop up button in the data item display page.

5. The method of claim 4, wherein when the long press time in the data item display page is greater than or equal to the preset threshold time, the method further comprising:
closing the information interface when monitoring a user stopped the long press.

6. The method of claim 1, wherein the at least one guidance information comprises at least one of the following:
trial report information of the target data item;
public evaluation report matched the target data item;
particular consumers' evaluations matched the target data item; or
obtained customized information of the target data item.

7. The method of claim 1, further comprising:
closing the information interface based on an instruction outside of the information interface.

8. The method of claim 1, wherein the information interface is displayed on top of the data item display page.

9. The method of claim 1, wherein pre-customizing user specified information associated with a plurality of data items further includes determining the user specified information based at least in part on user interest associated with a category of the data item.

10. The method of claim 1, wherein the preset character includes character P, and the method further comprises:
determining that the user operation includes a sliding trace that matches the character P, and
determining the category of the user specified information being a picture category.

11. The method of claim 1, wherein the preset character includes character W, and the method further comprises:
determining that the user operation includes a sliding trace that matches the character W, and
determining the category of the user specified information being a parameter category.

12. The method of claim 1, wherein the preset character includes character V, and the method further comprises:
determining that the user operation includes a sliding trace that matches the character V, and
determining the category of the user specified information being a video category.

13. An apparatus comprising:
one or more processors; and
one or more memories stored thereon computer readable instructions that, when executed by one or more processors, cause the one or more processors to perform functions of multiple units, the multiple units comprise:
an operation monitoring unit implemented on the one or more memories and configured to determine a user operation associated with a target data item displayed on a data item display page;
a data acquiring unit implemented on the one or more memories and configured to determine the user operation includes a sliding trace that matches a preset character, determining a category of the user specified information corresponding to the preset character, and obtain item information of the target data item according to the category from at least one data source;
an information constructing unit implemented on the one or more memories and configured to
pre-customize user specified information associated with a plurality of data items,
determine user specified information of the target data item based on the pre-customized user specified information associated with the target data item by combining one or more items from the obtained item information, and
obtain at least one guidance information of the target data item, the at least one guidance information providing ratings of the target data item by other users;
an interface generating unit implemented on the one or more memories and configured to generate an information interface including the user specified information and the at least one guidance information based on the determined user operation associated with the target data item;
a displaying unit implemented on the one or more memories and configured to display the information interface on the data item display page; and
an interactive interface unit implemented on the one or more memories and configured to receive a user interaction on a link in the user specified information, jumps to a target page corresponding to the link in the user specified information; and closes the information interface upon detecting a return from the target page.

14. The apparatus of claim 13, wherein the interactive interface unit is further configured to execute a corresponding operation in response to another instruction generated based on the interaction on the information interface.

15. The apparatus of claim 13, wherein the at least one guidance information comprises at least one of the following:
trial report information of the target data item;
public evaluation report matched the target data item;
particular consumers' evaluations matched the target data item; or
obtained customized information of the target data item.

16. The apparatus of claim 13, wherein the information constructing unit is further configured to:
combine the item information based on the category of the user specified information; and
generate the user specified information of the target data item.

17. The apparatus of claim 13, wherein the interface generating unit is further configured to:
place the user specified information to a corresponding display window of an information interface template; and
generate the information interface based on the information interface template.

18. One or more non-transitory memories stored thereon computer readable instructions that, when executed by one or more processors, cause the one or more processors to perform acts comprising:
pre-customizing user specified information associated with a plurality of data items;
determining a user operation associated with a target data item displayed on a data item display page;
determining the user operation includes a sliding trace that matches a preset character;
determining a category of the user specified information corresponding to the preset character;
obtaining the item information of the target data item according to the category from at least one data source;
determining user specified information of the target data item based on the pre-customized user specified information associated with the target data item by combining one or more items from the obtained item information;

obtaining at least one guidance information of the target data item, the at least one guidance information providing ratings of the target data item by other users;

generating an information interface including the user specified information and the at least one guidance information based on the determined user operation associated with the target data item;

displaying the information interface on the data item display page;

receiving a user interaction on a link in the user specified information;

jumping to a target page corresponding to the link in the user specified information; and closing the information interface upon detecting a return from the target page.

19. A client terminal, comprising:

one or more memories;

a display unit implemented on the one or more memories and configured to display a data item display page;

a sensor unit configured to obtain operations on the data item display page;

a processing unit, coupled to the display unit and the sensor unit, configured to:

pre-customize user specified information associated with a plurality of data items, determine a user operation associated with a target data item displayed on the data item display page, determine the user operation includes a sliding trace that matches a preset character, determine a category of the user specified information corresponding to the preset character, obtain item information of the target data item according to the category from at least one data source, determine user specified information of the target data item based on the pre-customized user specified information associated with the target data item by combining one or more items from the obtained item information and obtain at least one guidance information of the target data item, the at least one guidance information providing ratings of the target data item by other users;

generate an information interface including the user specified information and the at least one guidance information based on the determined user operation associated with the target data item;

receive a user interaction on a link in the user specified information;

jump to a target page corresponding to the link in the user specified information; and close the information interface upon detecting a return from the target page; and the display unit further configured to display the information interface on the data item display page.

\* \* \* \* \*